Sept. 19, 1967 G. B. GREENE 3,342,297
FLUIDYNAMIC SYSTEM AND METHOD OF OPERATION
Filed Aug. 26, 1965 26 Sheets-Sheet 1

GEORGE B. GREENE
INVENTOR
BY- *Rankin A. Mulliken*
ATTORNEY

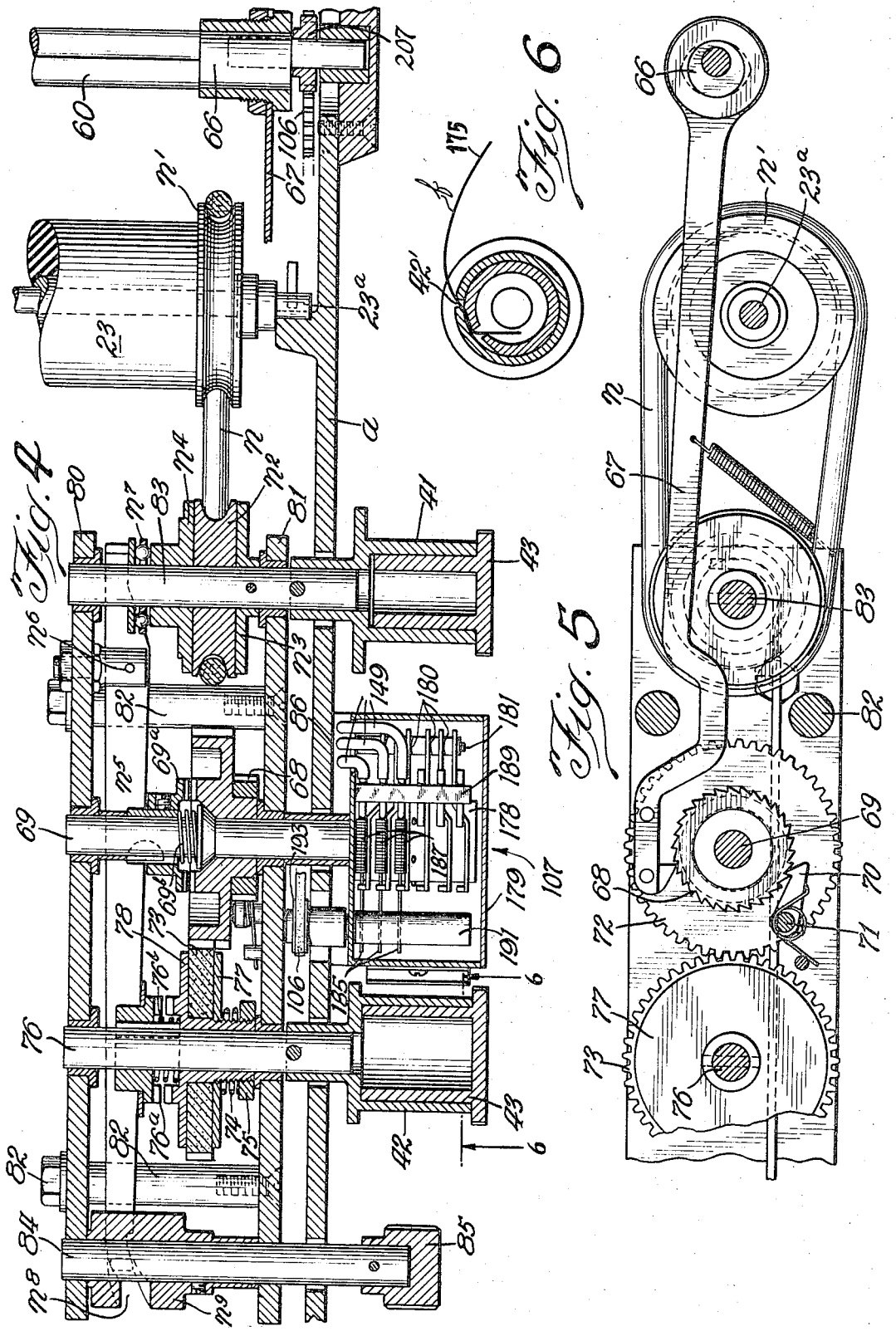

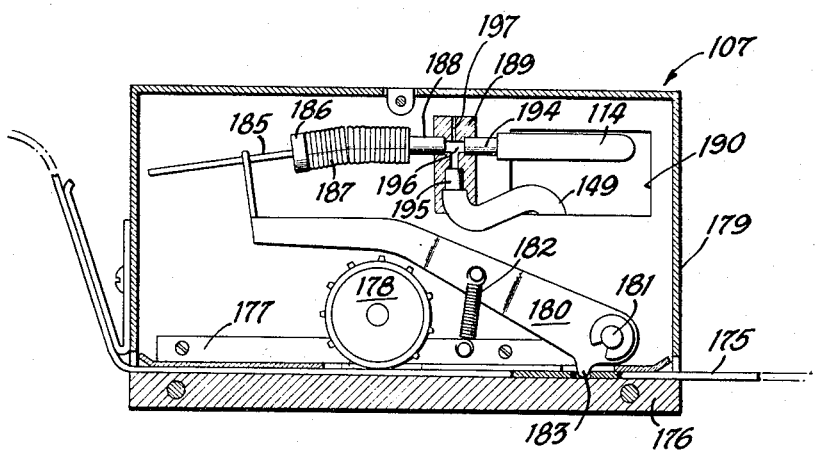
Fig. 7.1
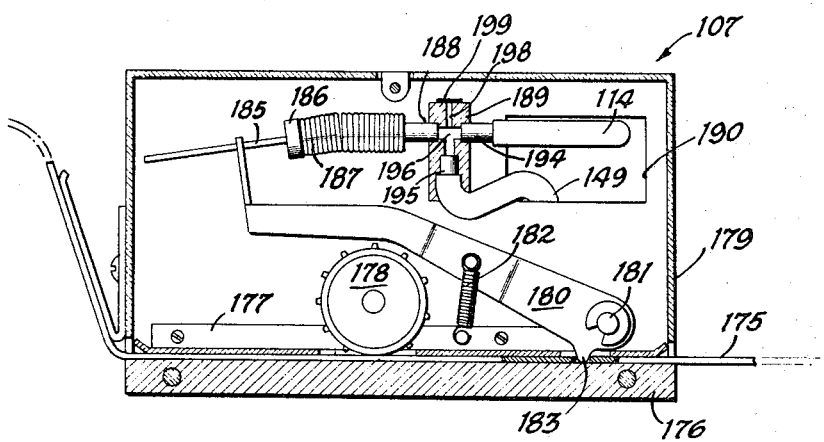
Fig. 7.2

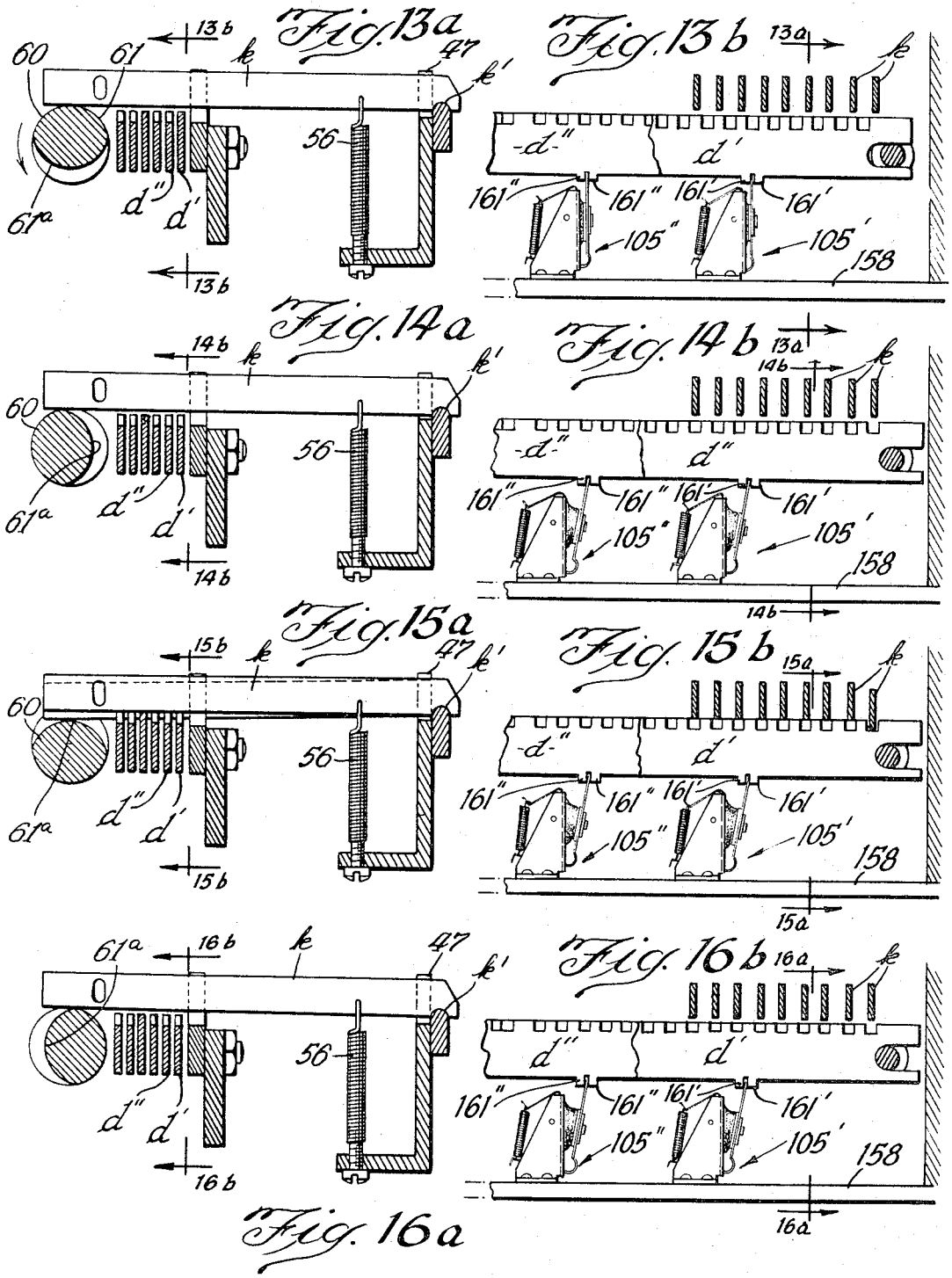

Sept. 19, 1967          G. B. GREENE          3,342,297
FLUIDYNAMIC SYSTEM AND METHOD OF OPERATION
Filed Aug. 26, 1965          26 Sheets-Sheet 9
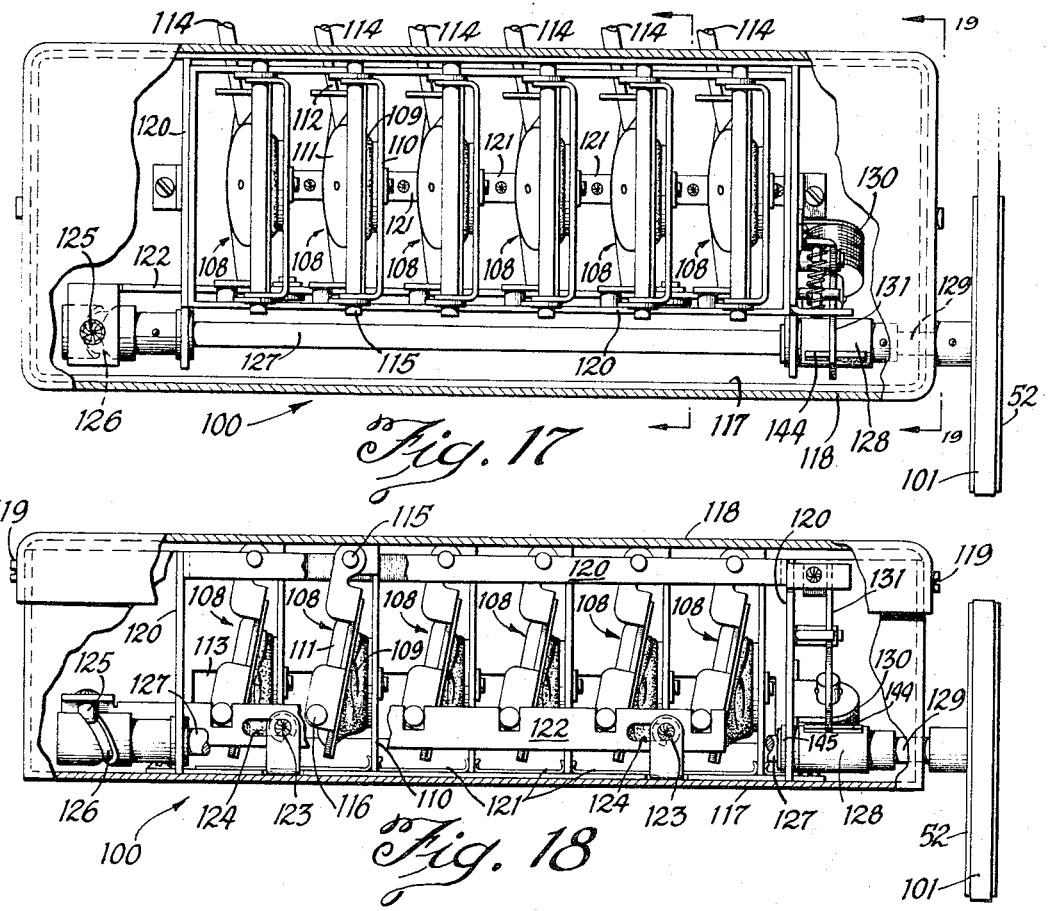
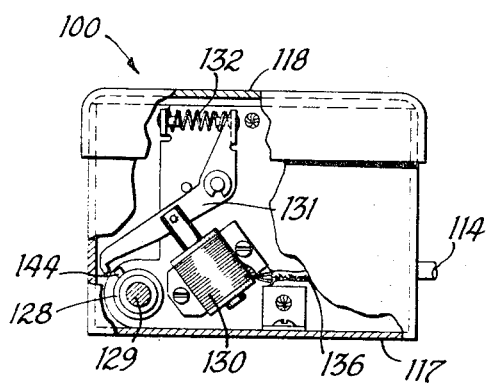
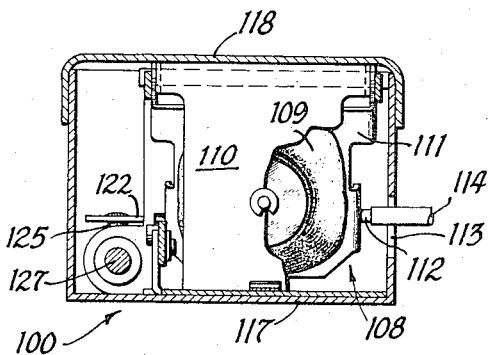

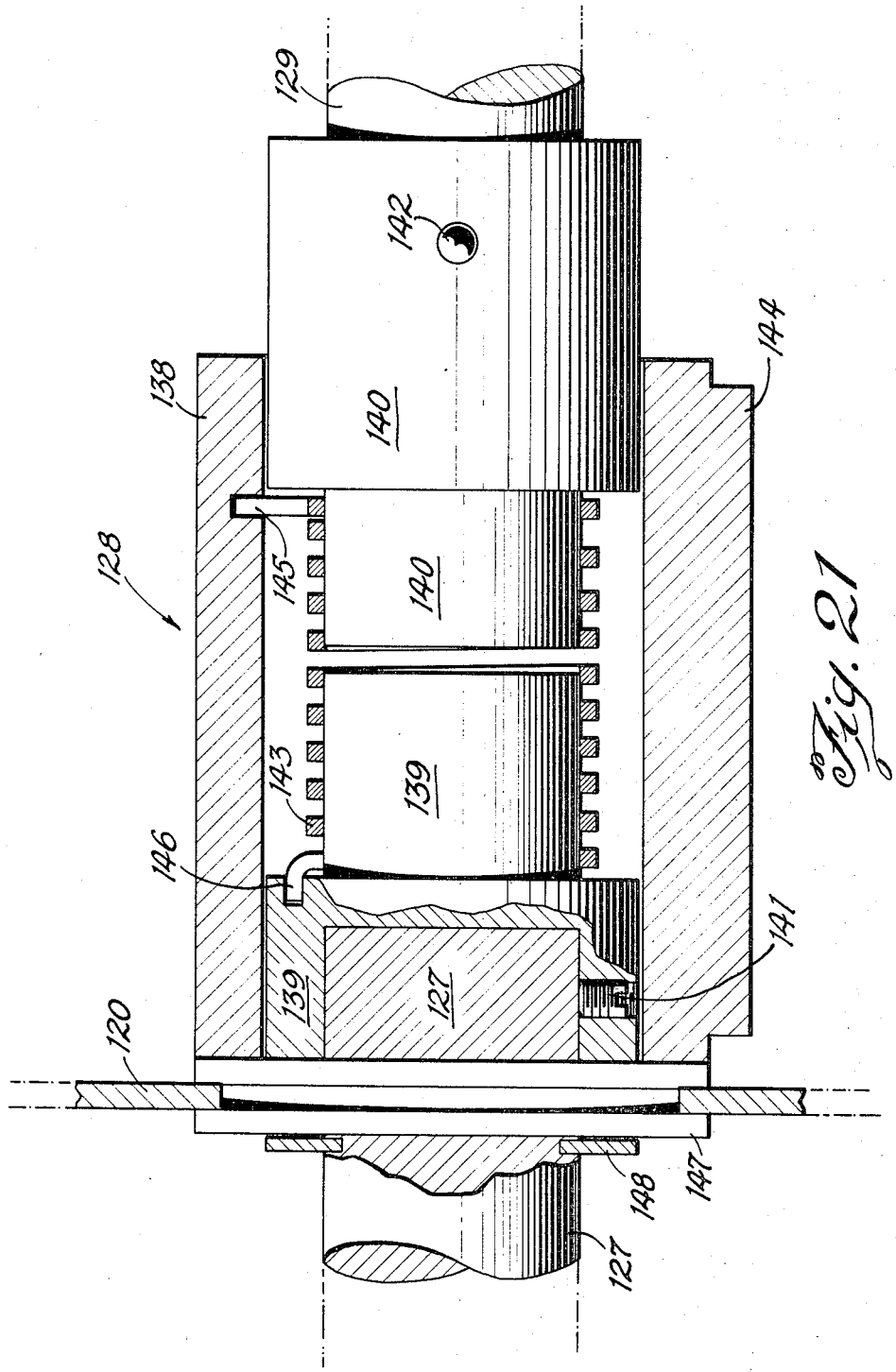

ELEMENT SYMBOLS
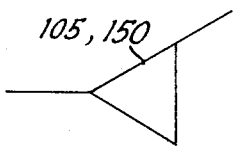
a. PULSATOR
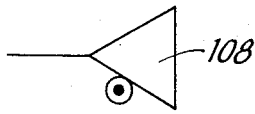
b. PULSER
c. FLUID CONDUIT
d. SHAFT
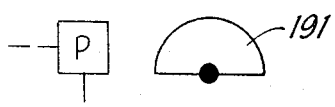
e. DUMP CAM
(COMMON MODULATOR CONTROL)
(PURGER)
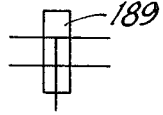
f. MANIFOLD
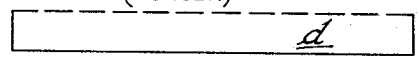
g. PERMUTATION BAR
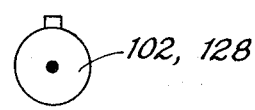
h. CYCLE CLUTCH
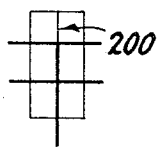
n. BLEEDER
(PURGER)
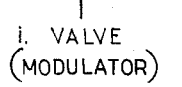
i. VALVE
(MODULATOR)
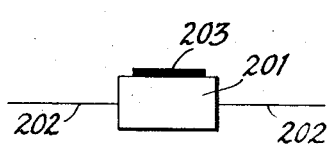
o. CHECK VALVE
(PURGER)
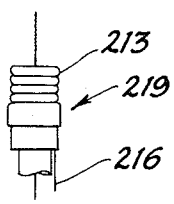
p. BELLOWS VALVE
(MODULATOR)
CONDITION SYMBOLS
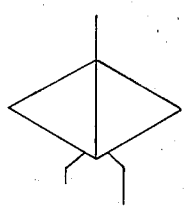
q. PUSH-PULL PULSATOR
j. OPEN
k. CLOSED
L. OPENING
r. NEUTRAL
*Fig. 22*
m. CLOSING

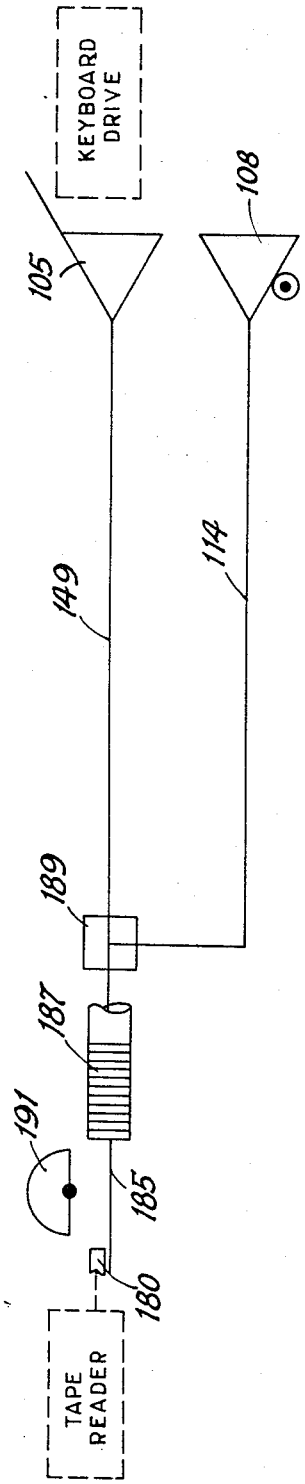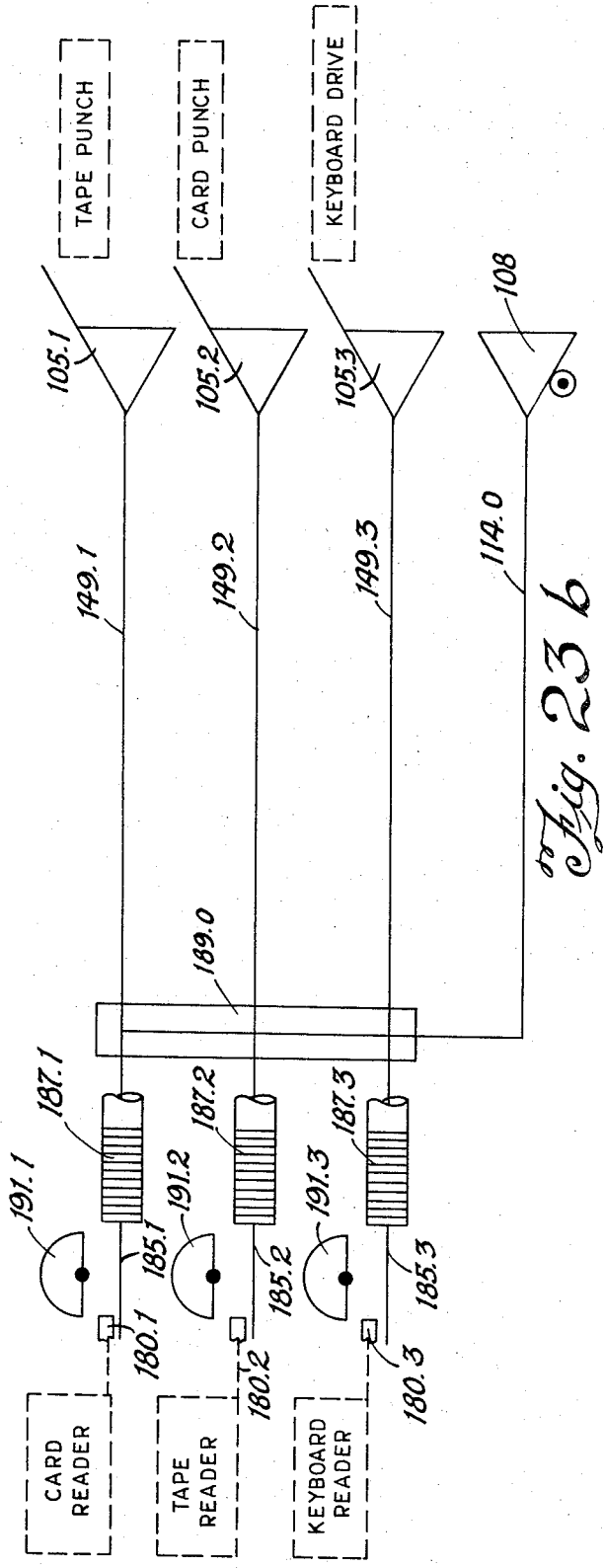

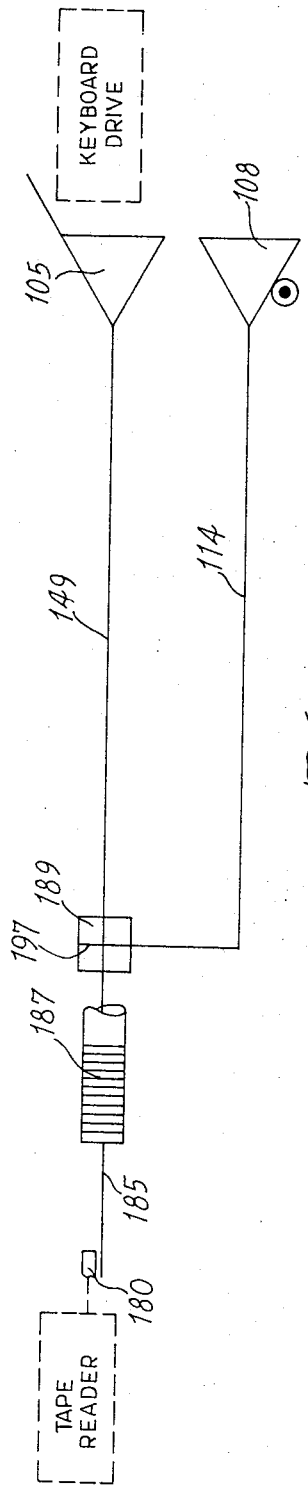
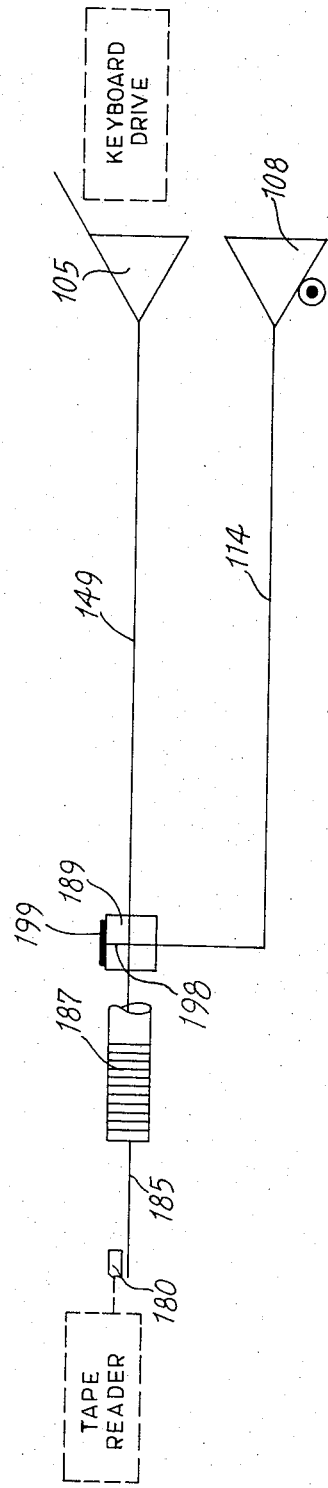

Sept. 19, 1967  G. B. GREENE  3,342,297
FLUIDYNAMIC SYSTEM AND METHOD OF OPERATION
Filed Aug. 26, 1965  26 Sheets-Sheet 14

1. PURGER CAM "CLOSED." †
2. PULSERS MAX. OPEN.
3.a PULSATORS CLOSING. *
3.b PULSATORS FULL LEFT *

1. PURGER CAM "CLOSED." †
2. PULSERS OPENING.
3.a. PULSATORS CLOSING. *
4. READING TIME SHADED.

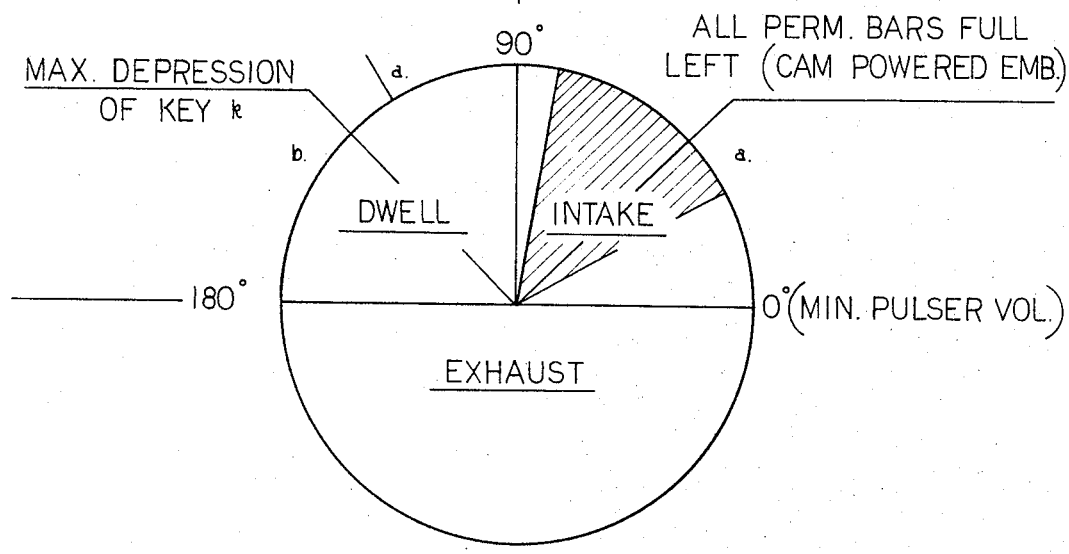

1. PURGER CAM "OPEN" †
2. PULSER CLOSING
3. PULSATORS OPEN (i.e., PERM. BARS ALL RIGHT, OR HOME IN DIRECT DRIVE EMB.)

† IN ROTARY PURGER EMBODIMENT ONLY
* EXCEPT WHEN ASSOCIATED VALVE OPEN.

BASIC (PULSER) CYCLE

*Fig. 24*

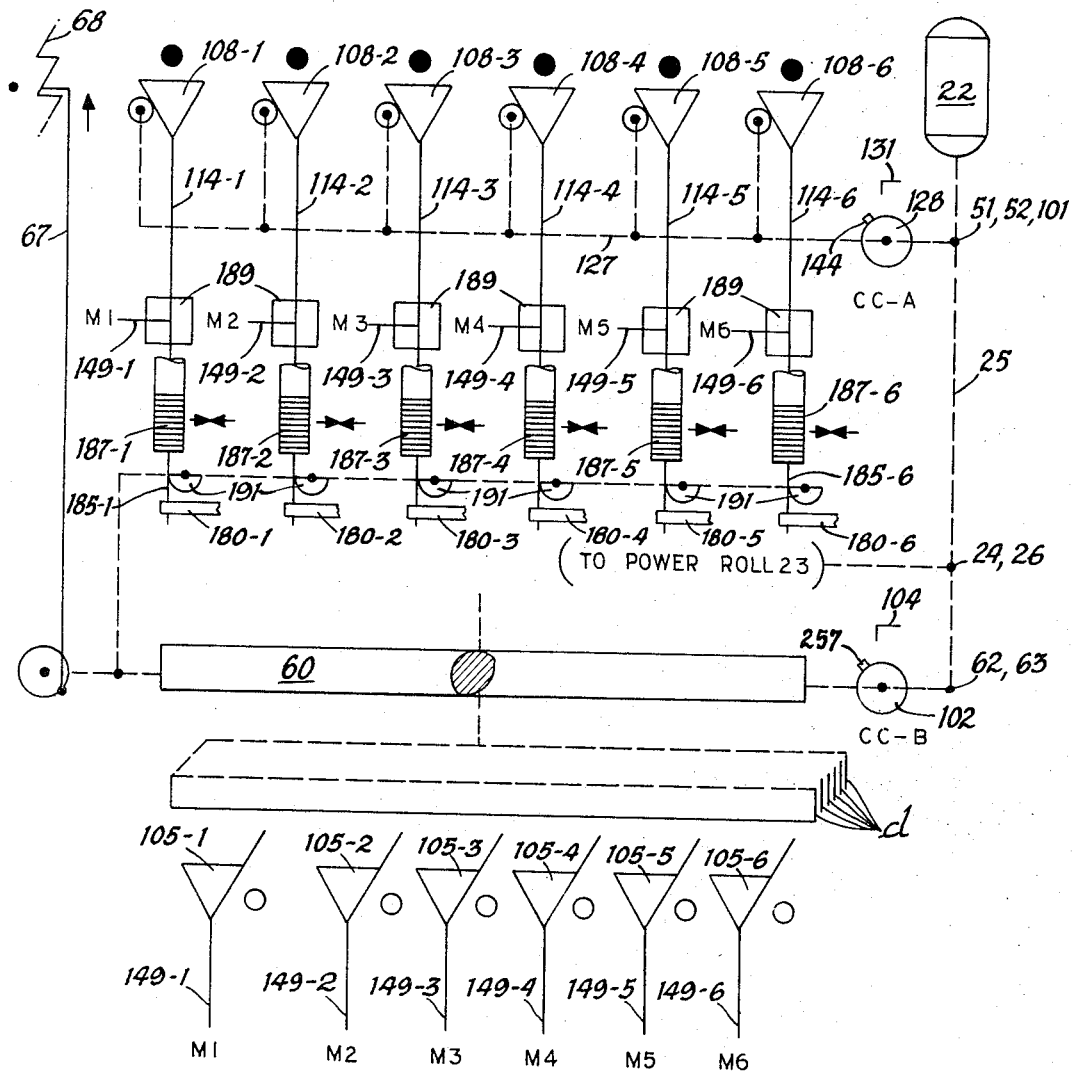
ZERO DEGREES OF BASIC (PULSER) CYCLE
(ALL ROTATIONS SHOWN COUNTERCLOCKWISE)
*Fig.* 25

45 DEGREES OF BASIC (PULSER) CYCLE
(ALL ROTATIONS SHOWN COUNTERCLOCKWISE)
MODULATOR VALVES AND PULSATORS SHOWN READING "A" FROM TAPE

135 DEGREES OF BASIC (PULSER) CYCLE
ALL ROTATIONS SHOWN COUNTERCLOCKWISE
PULSATORS SHOWN STORING "A" FROM TAPE

Sept. 19, 1967 G. B. GREENE 3,342,297
FLUIDYNAMIC SYSTEM AND METHOD OF OPERATION
Filed Aug. 26, 1965 26 Sheets-Sheet 18

270 DEGREES OF BASIC (PULSER) CYCLE
(ALL ROTATIONS SHOWN COUNTERCLOCKWISE)

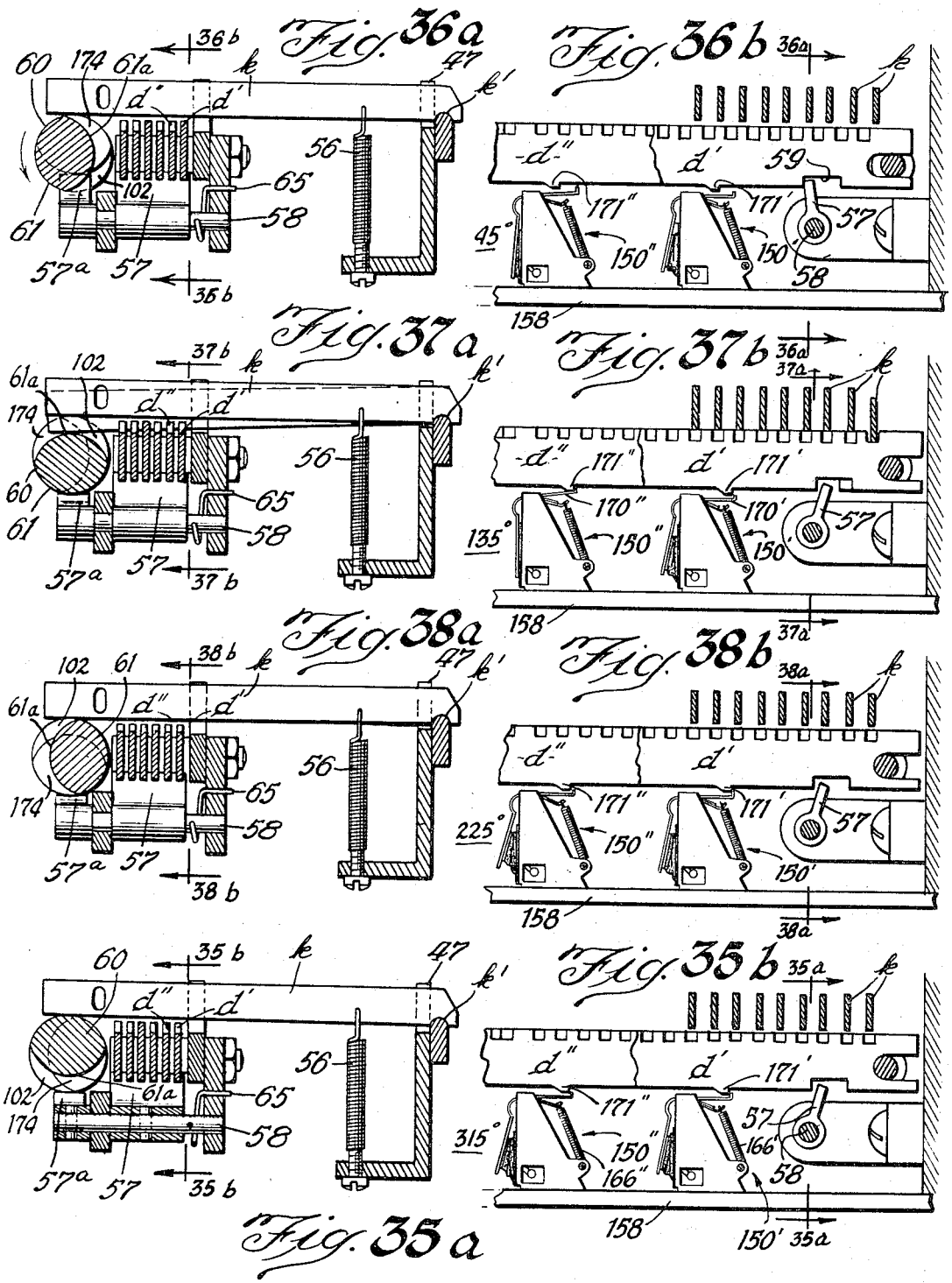

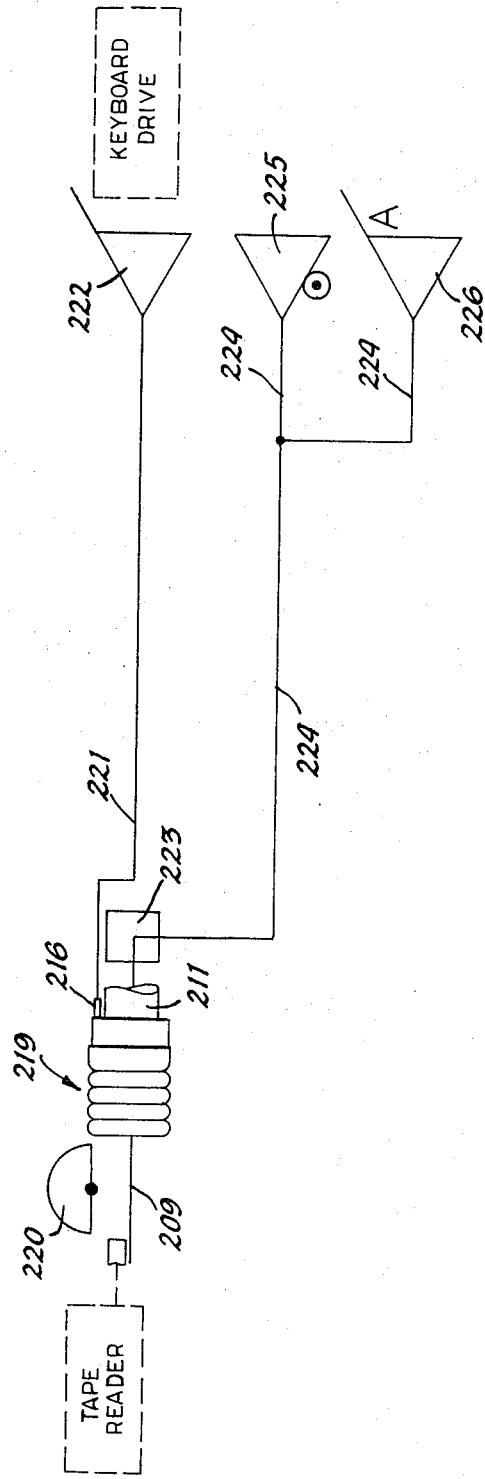

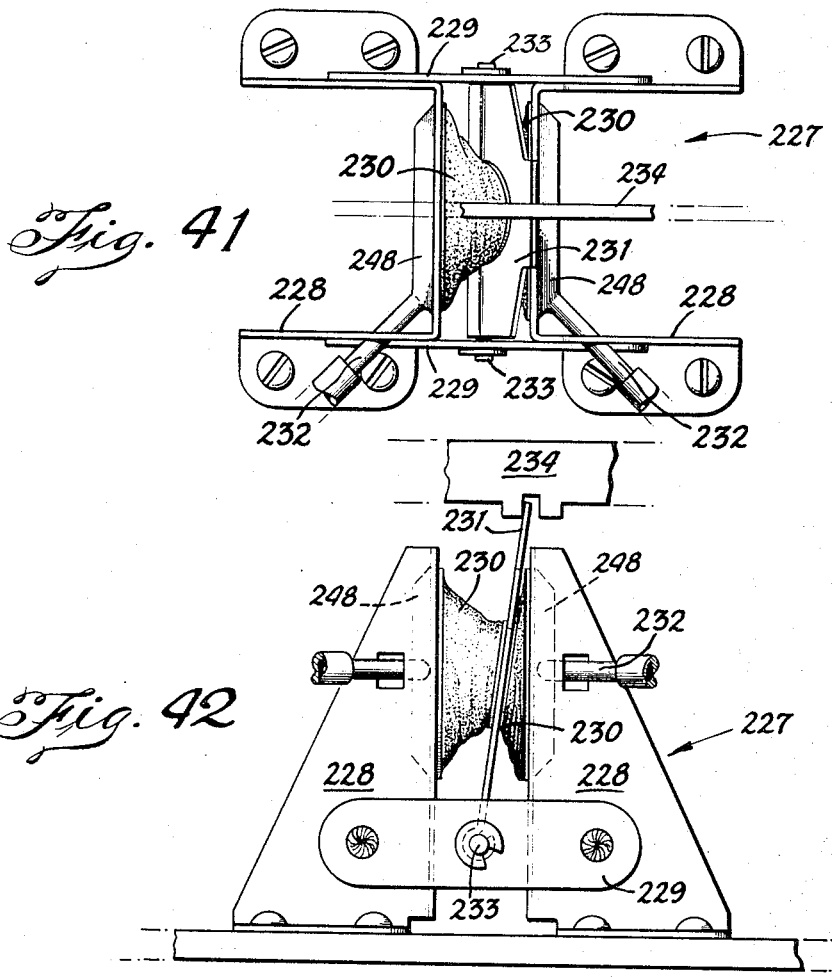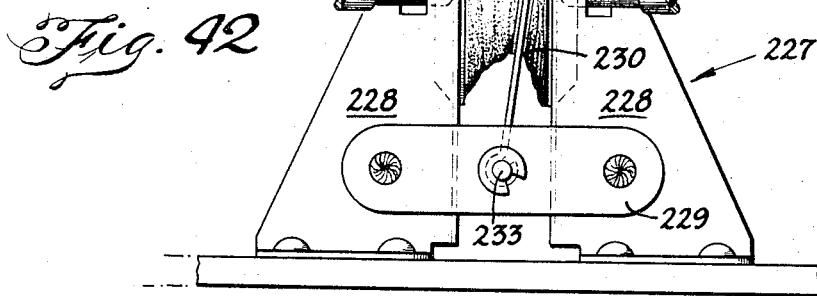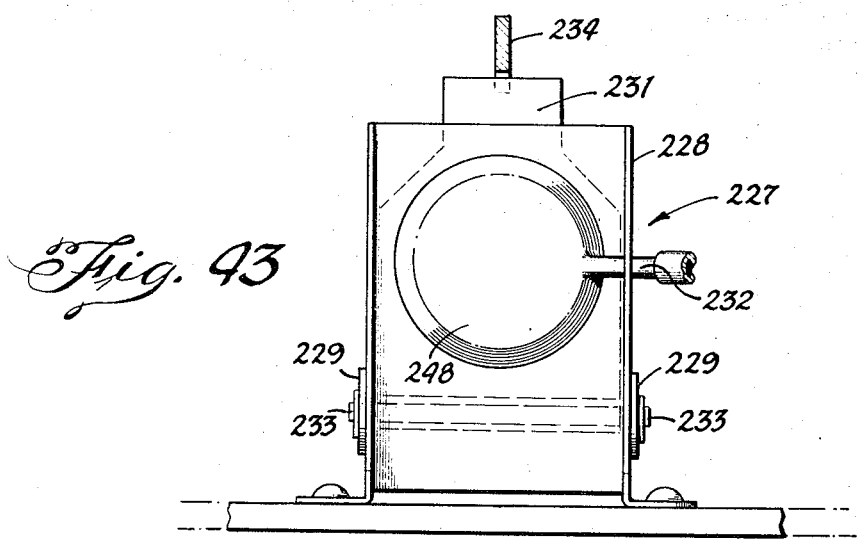

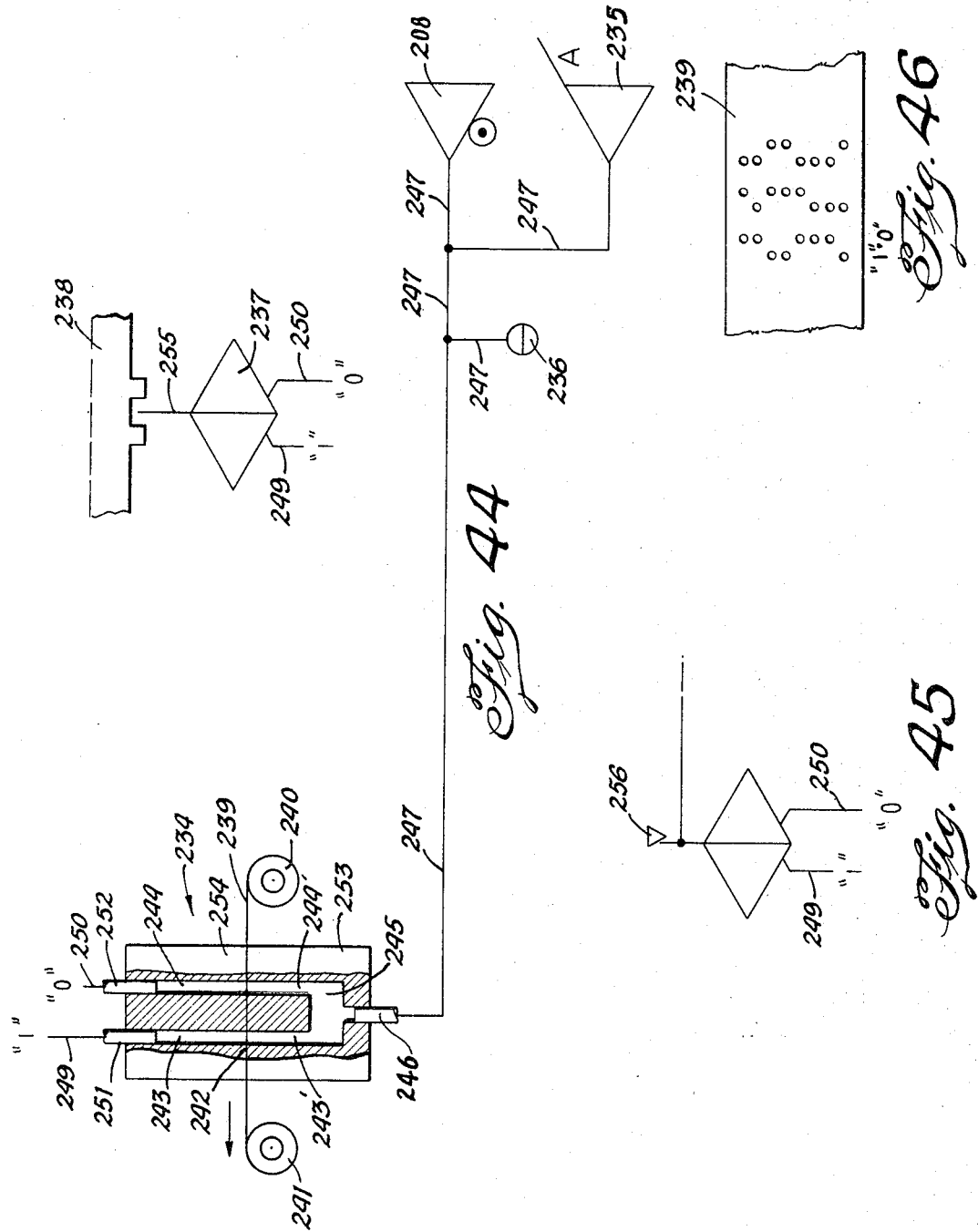

United States Patent Office 3,342,297
Patented Sept. 19, 1967

3,342,297
FLUIDYNAMIC SYSTEM AND METHOD OF OPERATION
George B. Greene, Lafayette, Calif. (2500 Anniversary Lane, Newport Beach, Calif. 92660)
Filed Aug. 26, 1965, Ser. No. 482,816
6 Claims. (Cl. 197—20)

(1) TABLE OF CONTENTS

|  | Column |
|---|---|
| 1. Table of Contents | 1 |
| 2. Field of Art | 1 |
| 3. The Prior Art | 1 |
| 4. Problems Solved by the Invention | 1 |
| 5. Objects of the Invention | 2 |
| 6. Brief Description of the Figures | 4 |
| 7. The Instant Invention Compared with Buckley | 6 |
| 8. Conventions | 6 |
| 9. The Construction of an Embodiment | 9 |
| 9.1. The Construction of the Pulser Bank | 10 |
| 9.2. The Construction of the Cycle Clutches | 12 |
| 9.3. The Construction of the Permutation Bar Drive Means (Pulsators, etc.) | 13 |
| 9.3.1. In the Direct Drive Embodiment (FIG. 3) | 14 |
| 9.3.1.1. The Direct Drive Pulsator | 14 |
| 9.3.1.2. Direct Drive Operation | 14 |
| 9.3.2. The Cam-Powered Embodiment (FIG. 30) | 15 |
| 9.3.2.1. The Cam-Powered Drive Pulsator | 15 |
| 9.3.2.2. Cam-Powered Operation | 17 |
| 9.4. The Reader | 17 |
| 9.4.1. Cam-Operated Purging | 17 |
| 9.4.2. Bleeder Purging | 19 |
| 9.4.3. Check Valve Purging | 19 |
| 9.5. Definitions of Terms Used Herein | 19 |
| 9.6. Alternative Embodiments of a Single Channel | 23 |
| 9.6.1. Single Input, Single Output, Cam-Operated Purging | 23 |
| 9.6.2. Multiple Input, Multiple Output, Cam-Operated Purging | 23 |
| 9.6.3. Single Input, Single Output, Bleeder Purging | 24 |
| 9.6.4. Single Input, Single Output, Check Valve Purging | 24 |
| 9.6.5. Single Input, Single Output, Fully Sealed | 24 |
| 9.6.6. Single Input, Single Output, Quasi-Sealed | 26 |
| 10. Construction of a Complete Embodiment | 30 |
| 11. Operation of a Complete Embodiment | 30 |

(2) FIELD OF ART

This invention relates to improved fluidynamic information transmission and control systems and methods of operation; and, more particularly, to improved control systems for automatic apparatus as may be employed in translating coded information to mechanical movements as may be required in automatic typewriters and sewing and knitting equipments, and in devices such as Jacquard looms, railroad interlocking machines, accounting machines, composing machines, justifying typewriters, perforated tape code translators, perforated card-to-tape converters, and the like, and methods of operating the same.

(3) THE PRIOR ART

Fluid-operated, or fluidynamic, automatic control systems have long been known in the data processing arts, an example of such a system being shown and described in U.S. Patent No. 2,247,275, issued to A. H. Buckley on June 24, 1941, and hereinafter referred to as "Buckley."

A further example of such a system may be seen in U.S. Patent No. 2,958,567, issued to L. V. Oxley, et al., on Nov. 1, 1960.

Yet another example of a fluidynamic control system defining "fluidynamic" broadly, as is done herein, may be found in U.S. Patent No. 3,219,165, issued to George B. Greene and others on Nov. 23, 1965.

(4) PROBLEMS SOLVED BY THE INVENTION

Such prior art pneumatic systems, however, have been characterized by certain problems of construction, maintenance, and operation which have seriously impeded their general adoption.

For instance, the pneumatically operated automatic control systems for data processing devices found in the prior art have generally been characterized by sensitivity to ingestion of dirt and dust (e.g., "dust" from the edges of the holes in perforated tape), the ingested matter becoming entrapped within the pneumatic system and thereby clogging valves, constrictions, T's and sharp bends in conduits, etc.

Further, maintenance of such prior art devices has been rendered difficult by the complexity and considerable numbers of the valves employed, and the often difficult accessibility of some of such valves. For instance, certain of such prior art systems are characterized in that each effector (e.g., type bar actuator) comprises a check valve which forms part of the effector, or is necessarily located closely adjacent thereto. These check valves must, of course, be maintained, and due to their unity with their associated effectors are often located in inconvenient positions for the efficient carrying out of such maintenance. Additionally, such check valves may often require critical adjustment, relying as they do upon mechanical dimensions and spring tension.

Yet another problem of the devices of the prior art is that of the inefficiency arising from the employment of a single pump as a source of operating pressure. As is well known to those skilled in the art, the employment of a single pump requires the employment of a constriction, check valve, or the like in each separate feed line from such pump to a data channel. Each such constriction, check valve, or the like constitutes a drain upon the source pump, thereby reducing the overall efficiency of the system, and, at the same time, is a possible source of maintenance problems by way of clogging, maladjustment, etc. On the other hand, the expedient of employing a single, regulated source pump of the kind used as a common source in the prior are in each data channel would clearly give rise to economically intolerable expense due to the necessary criticality, complexity, and need for adjustment and maintenance of each such pump.

By no means the least of the problems characterizing the prior art devices is the effect of the channel isolating constrictions and check valves necessarily employed therein upon the speed of response of those devices.

Another major impediment to the general adoption of prior art fluidynamic devices, e.g., automatic, tape-controlled typewriters, has been the need for two supply heads, such as a vacuum level and ambient atmospheric pressure, the vacuum level necessarily being produced by at least one complex and expensive vacuum pump employing check valves and other regulating means.

Also, some prior art devices have been restricted in operating speed, and subject to leakage problems in both construction and maintenance, by the fact that their operation is based upon the "charging" of certain conduits and associated apparata, i.e., with pressure or vacuum, necessitating the provision of a relatively leak-tight system to avoid dissipation of the "stored charge" of pressure or vacuum, and extending the time of operation of each cycle because the "charge" and "discharge" phases cannot, by definition, overlap, thus reducing the operating speed.

In addition, some of the fluidynamic systems of the prior art suffer the defect that functionally distinct parts thereof are incorporated into single physical entities, as, for instance, the system of U.S. patent application Ser. No. 226,891, in which the alphabetic key effectors and energizers are integral, and, thus, incapable of being separately located in positions dictated by ease of assembly, adjustment, and maintenance.

(5) OBJECTS OF THE INVENTION

It is therefore an object of the present invention to provide a fluidynamic data transmission and control system having a minimum number of valves, constrictions, and the like, and a method of operation in carrying out which such a system may be provided.

Another object of the instant invention is to provide a fluidynamic formation transmission and control system which is resistant to the ingestion of dirt and dust, and a method of operation by the aid of which such a system may be provided.

Another object of the instant invention is to provide a fluidynamic control system for typewriters, sewing equipments, and the like which is free from the necessity for check valves, constrictions, or the like occasioned by the employment of a single pressure source pump to supply a plurality of information channels.

Yet another object of the instant invention is to provide a fluidynamic control system for typewriters, sewing equipments, and the like which avoids the employment of a multiplicity of constant head pumps, which pumps are usually complex and usually involve critical adjustment.

Another object of the instant invention is to provide a fluidynamic information transmission and control system for sewing equipments, data processing devices, and the like characterized by freedom from losses arising from the employment of check valves, constrictions, and the like in the energizers and effectors thereof, and a method of operation by the use of which such a system may be provided.

Yet another object of the instant invention is to provide a fluidynamic information transmission control system and method of operating the same for typewriters, and sewing equipments, and the like, which requires less maintenance than is common to devices of the prior art.

A further object of the instant invention is to provide a fluidynamic information transmission and control system for data processing devices, sewing equipments, and the like, which is relatively free from the necessity for performing critical adjustments in difficult locations, such as the adjustment of check valves located near or embodied in the air motor switch drive interponents and other typewriter actuating parts and a method of operation by the use of which such a system may be provided.

A still further object of the instant invention is to provide a fluidynamic control method and system for typewriters, knitting and sewing equipments, and the like which is characterized by high speed of operation at high efficiency.

Another object of the instant invention is to provide a fluidynamic control method and system for typewriters, sewing equipments, and the like which is comprised of relatively few and simple parts and steps, which parts are relatively free from reliance upon critical spacing, critical spring tensions, and the like, and said steps from critical timing.

Another object of the instant invention is to provide fluidynamic control systems for data processing devices, and machines in general, characterized by a simplified mode of synchronizing the control system with the mechanical operation of the device.

A further object of the instant invention is to provide a fluidynamic system for the control of typewriters, knitting and sewing equipments, and the like in which fluid pressure is employed directly to actuate permutation bars, interponents, and the like; and in which the necessity for supplementary power cams, or the equivalent, for driving such permutation bars, interponents, etc. is avoided.

Yet another object of the instant invention is to provide a fluidynamic control system for automatic equipments in which the operating fluid is supplied in pulsations synchronous with the cycles of mechanical operation of the equipments.

A further object of the instant invention is to provide such a fluidynamic system in which such pulsations normally occur in regular carrier trains in each information channel; afferent information being imparted to the information channels by modulation of said carrier trains, i.e., by attenuation of pulsations selected in accordance with the afferent information.

A further object of the instant invention is to provide a fluidynamic control system for sewing and knitting equipments, typewriters, and the like having separate energizing means in each information channel.

Another object of the instant invention is to provide methods and means whereby a substantial part of the fluid in a fluidynamic information transmission channel undergoes substantially zero net displacement during continuous operation of the system in which the channel is included (i.e., many cycles of operation of the system), thereby avoiding the ingestion of dirt into the system to a very substantial degree as compared with prior art devices.

Another object of the instant invention is to provide methods and means employing which a fluidynamic system may be provided which has physically separate effector, energizer, and receptor in each channel, thus permitting these functionally distinct units to be located remotely from each other, and making possible optimum design of any machine embodying such a system by way of ease of adjustment and repair, operator convenience, modular "packaging" for mounting in associated machines without substantial alteration, etc.

Another object of the instant invention is to provide methods and means whereby fluidynamic data systems may be built which are lighter, more compact, and more easily applied to existing machinery than has hitherto been possible.

Another object of the present invention is to provide methods and means whereby fluidynamic control and information transmission systems may be produced which require only one supply head for their operation, rather than two as in the prior art (e.g., U.S. Patent No. 2,894,614 to Lambert, issued July 14, 1959, hereinafter called "Lambert"; U.S. Patent No. 2,351,663 to Clark, issued June 20, 1944, hereinafter called "Clark," and Buckley, cited supra).

Another object of the instant invention is to provide method and means whereby single supply head fluidynamic systems may be produced in which the supply head is ambient atmosphere.

Another object of the instant invention is to provide methods and means whereby the successive steps of (1) "charging" the channels of a fluidynamic system with fluid pressure, or vacuum, and subsequently (2) discharging selected channels in accordance with afferent information as taught in the prior art (cf., Lambert, Buckley) may be avoided, and the two steps undertaken substantially simultaneously, thus making possible fluidynamic control and information transmission systems which are (1) highly tolerant of minor system leaks, since no storage of "charge" is necessary, and (2) capable of higher speeds of operation, since said steps are carried out simultaneously, rather than sequentially.

Other objects of the invention will in part be obvious and will in part appear hereinafter.

The instant invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the instant invention will be indicated in the claims. And while the invention is shown in the environ of an automatic typewriter, the invention is not limited to such use, being there shown as illustrative of just one presently preferred embodiment.

(6) BRIEF DESCRIPTION OF THE FIGURES

For a fuller understanding of the nature and objects of the invention reference should be had to the following detailed description taken in connection with the accompanying drawings, in which:

FIG. 4 is a detailed plan view in section showing a part of the structure shown in FIG. 3, particularly, a group of modulators, or channel control devices, according to the invention, and a common means for controlling the modulators of plural channels which forms part of the instant invention;

FIG. 5 is a detailed side view of a part of the structure shown in FIG. 4;

FIG. 6 illustrates the mode of engaging paper tape with the tape transport drums shown in FIG. 4;

Figure 1:
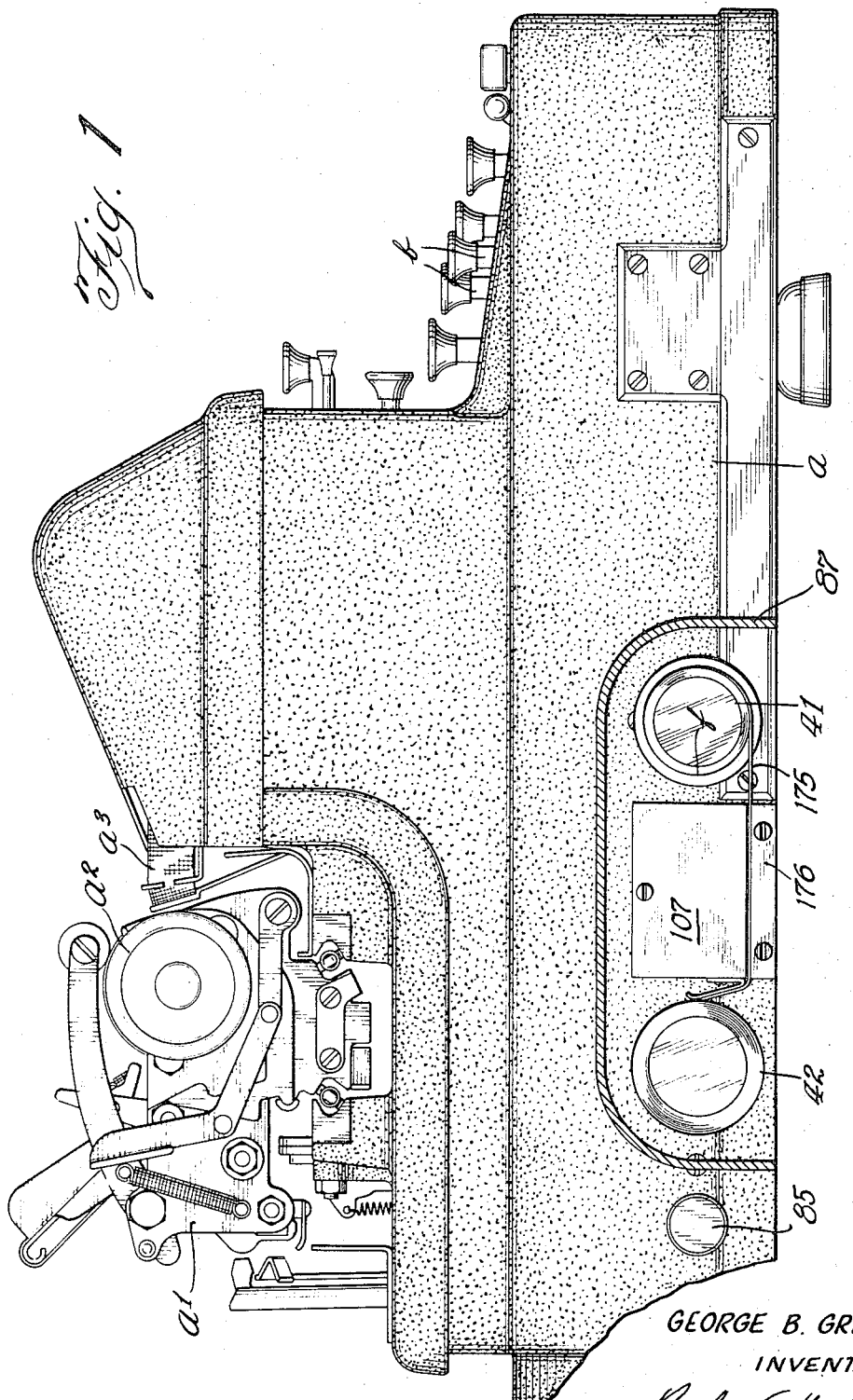
FIG. 1 illustrates an automatic motorized typewriter of the prior art equipped with the tape reading means disclosed in copending U.S. patent application Ser. No. 397,988.
Figure 2:
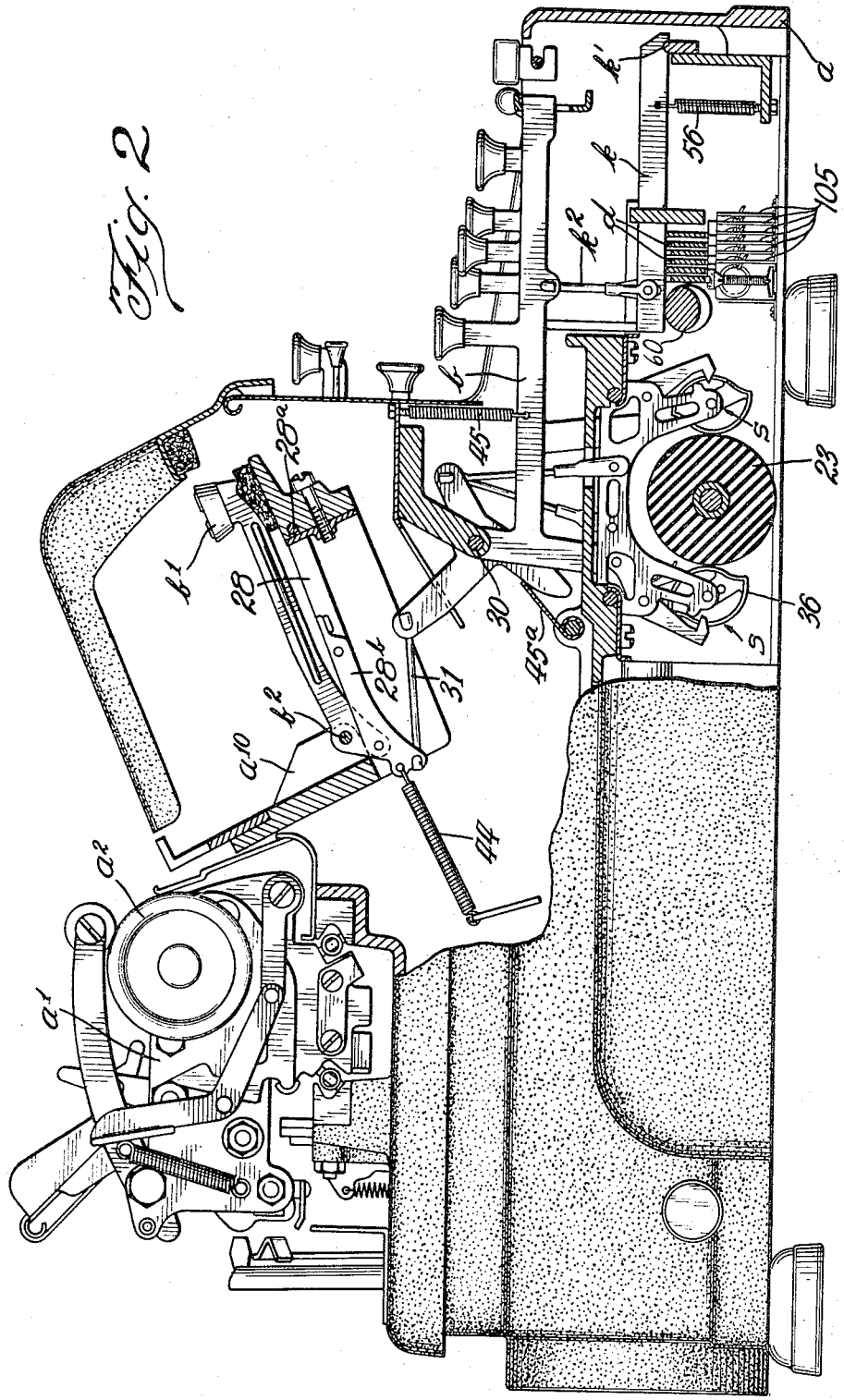
FIG. 2 illustrates an automatic motorized typewriter of the prior art equipped with pulsators 105, the movable members of which are adapted to directly drive the key selecting permutation bars $d$ in accordance with the instant invention.
Figure 3:
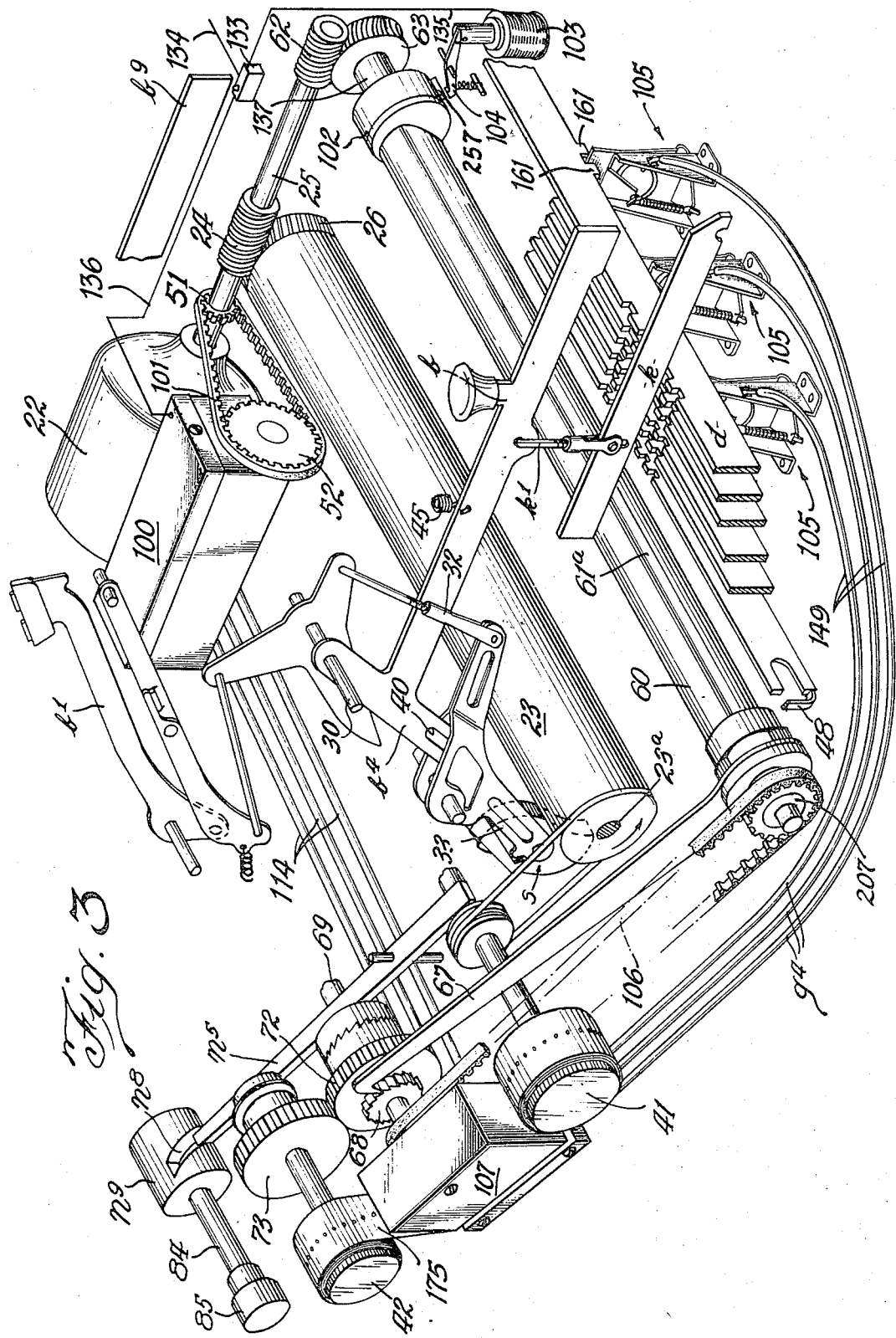
FIG. 3 is a perspective view showing in detail an automatic motorized typewriter of the prior art as modified in accordance with a first embodiment of the instant invention.
Figure 7:
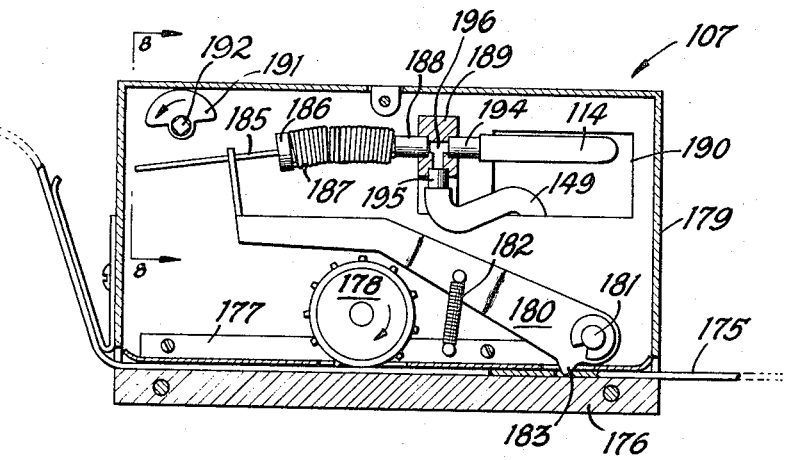
Figure 8:
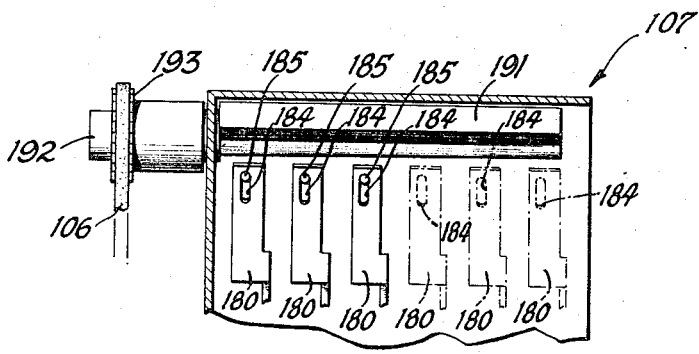
Figure 9:
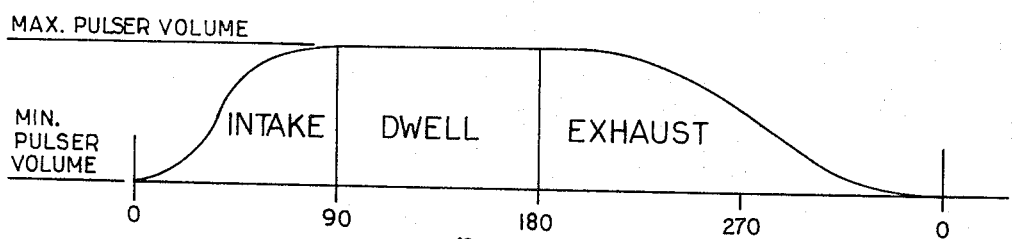
Figure 10:
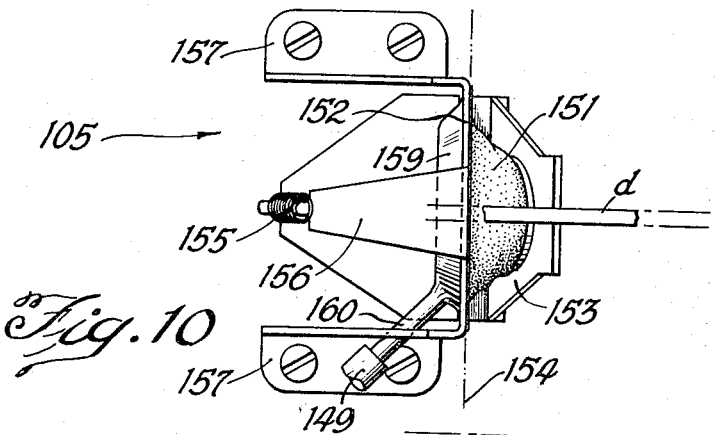
Figure 11:
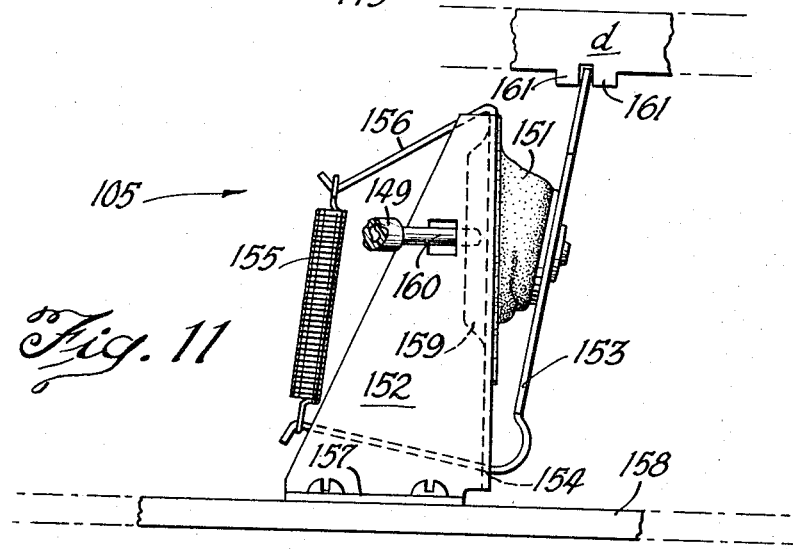
Figure 12:
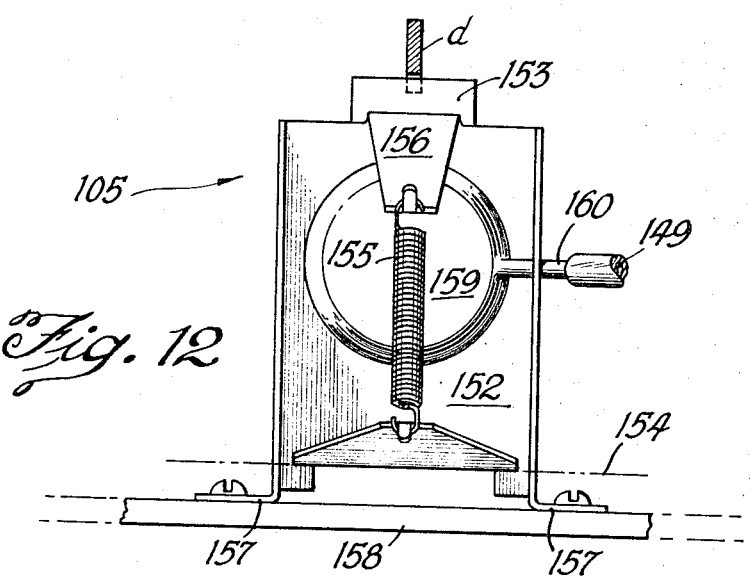
Figure 29:
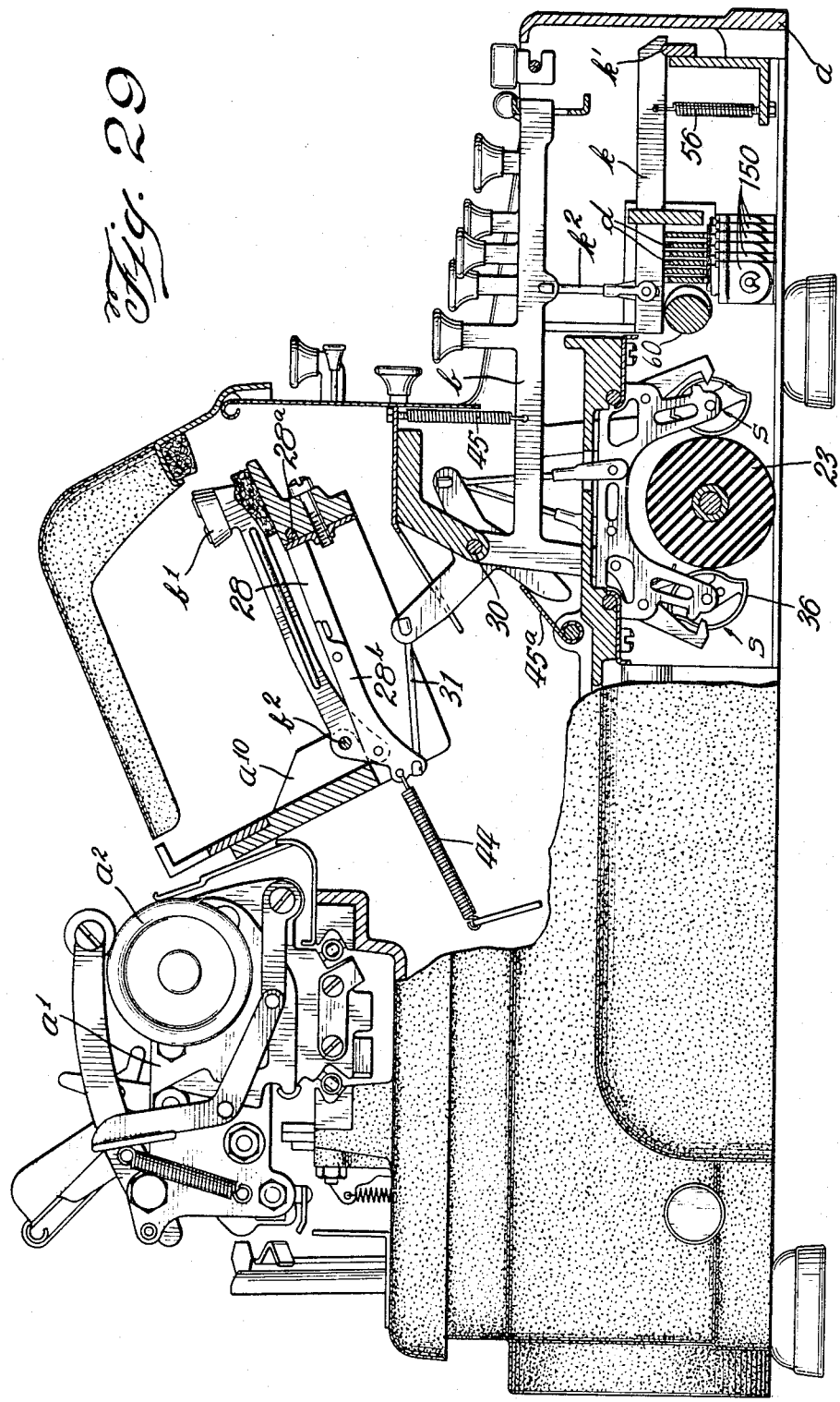
Figure 30:
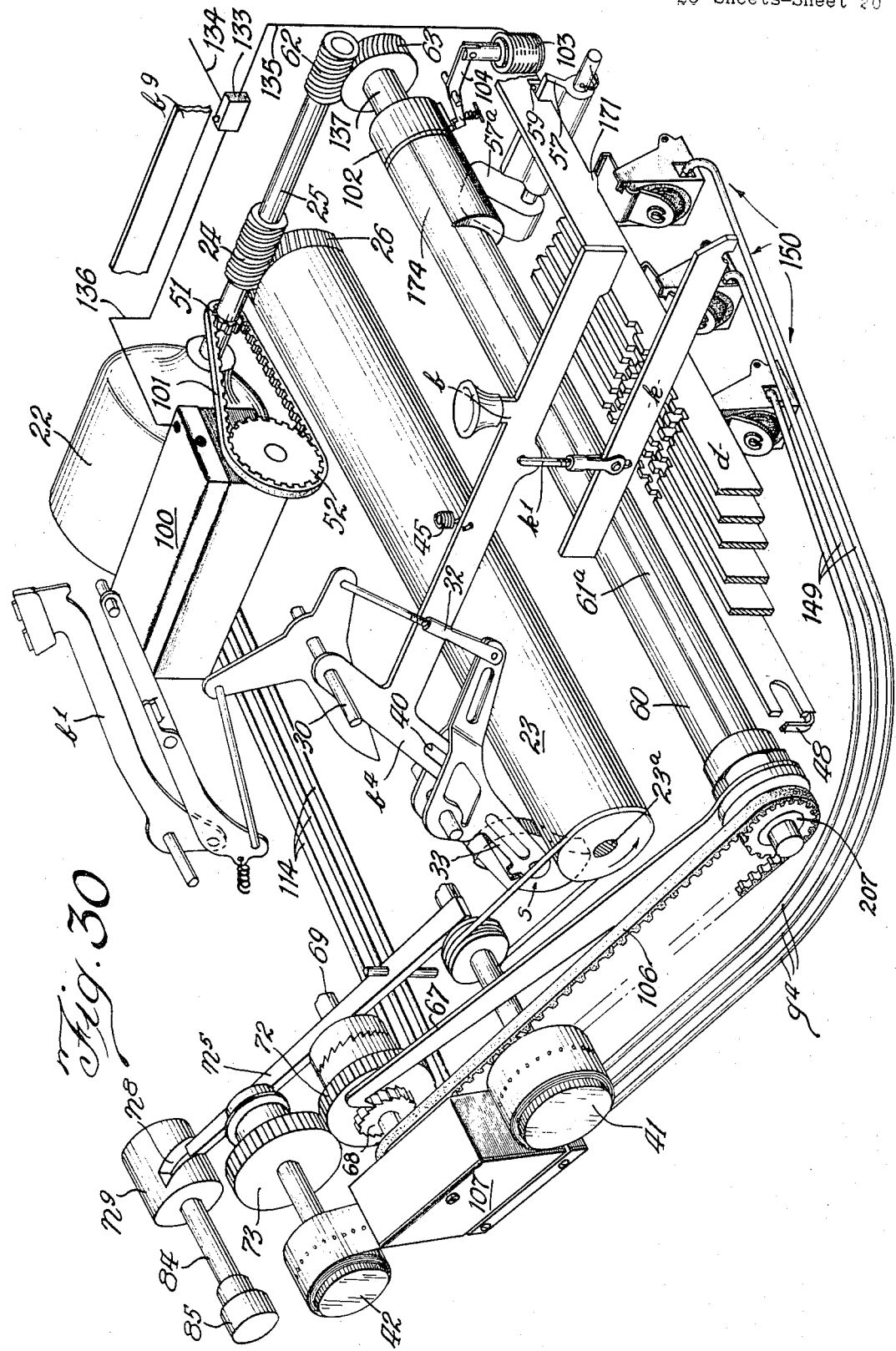
Figure 31:
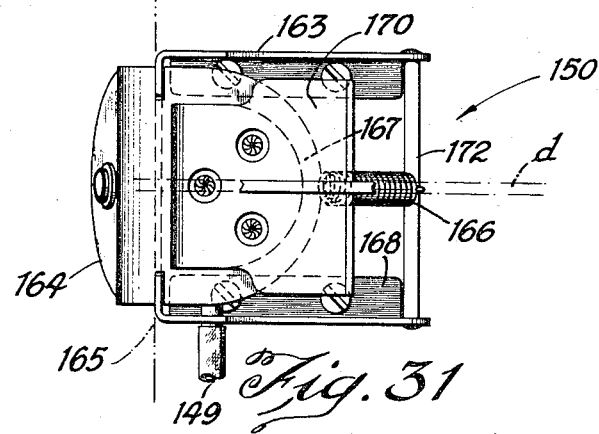
Figure 32:
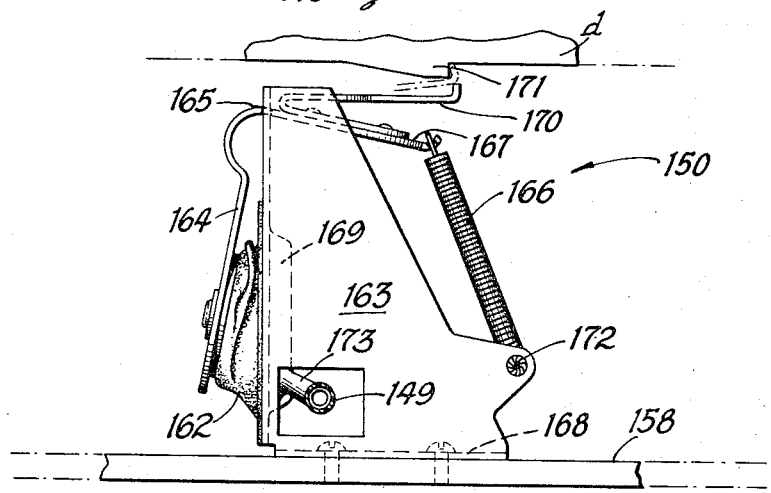
Figure 33:
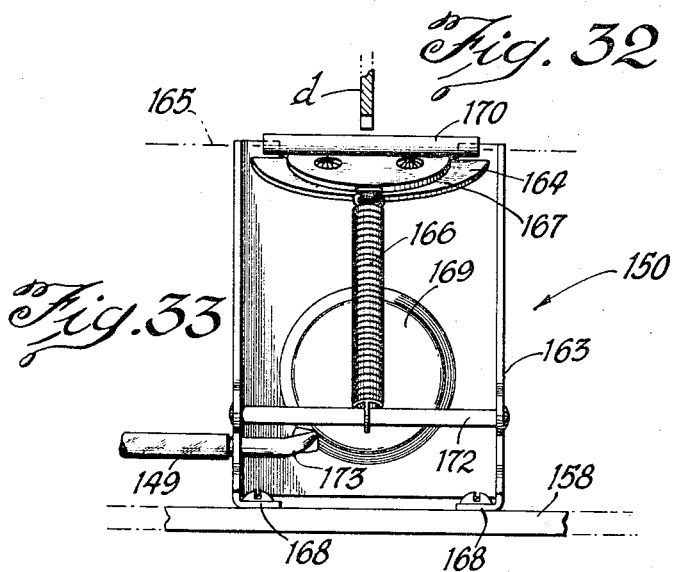
Figure 39:
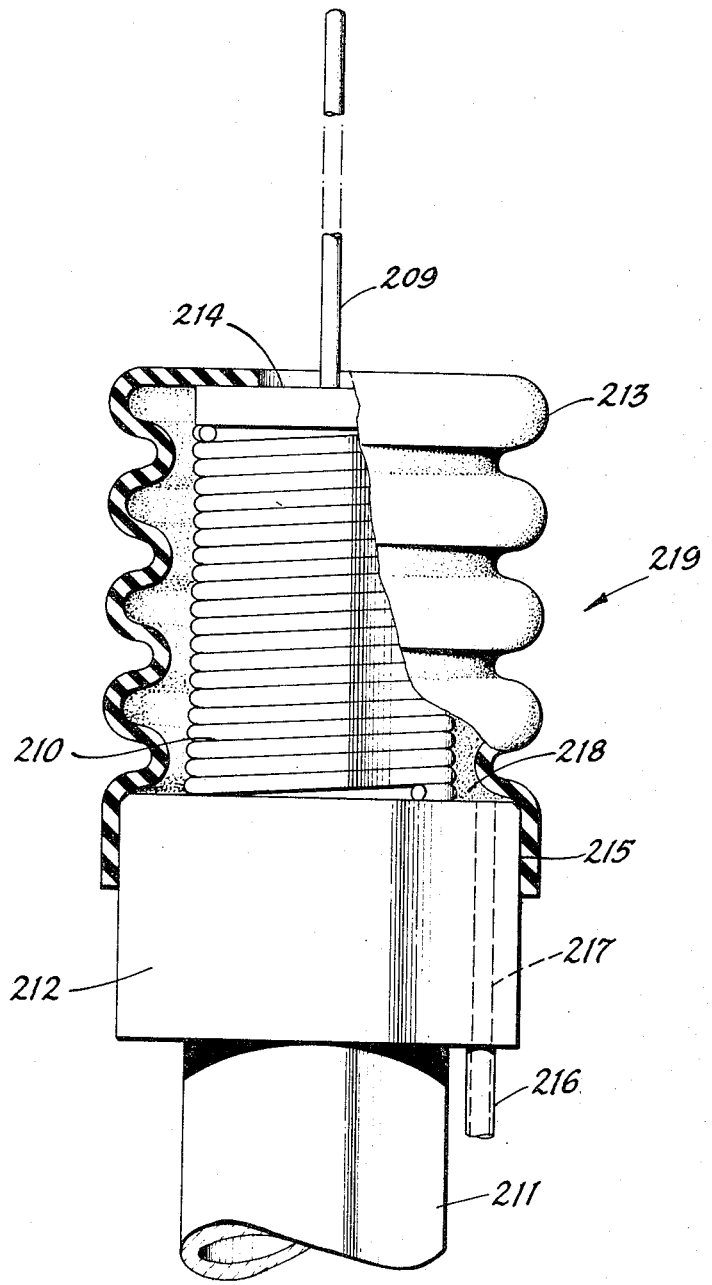

FIGS. 7, 7.1, and 7.2 are detailed side views in section of tape reading means equipped with purgers according to the instant invention, showing three embodiments of modulator control means according to the invention;

FIG. 8 is a sectional view of a part of the tape reading means shown in FIG. 7;

FIG. 9 is an idealized representation of the degree of vacuum found in any information channel of the embodiment of FIG. 3 which is not currently reading a tape perforation;

FIGS. 10, 11, and 12 illustrate a particular pulsator used in a first embodiment of the instant invention;

FIGS. 13a through 16b illustrate said first embodiment in several phases of its operation;

FIGS. 17 through 20 illustrate the bank of pulsers (in this case, respirators) employed in the embodiments of the instant invention shown and described herein;

FIG. 21 is a detailed side view in section of the general type of cycle clutch employed in the embodiments of the instant invention shown and described herein;

FIG. 22 shows the schematic symbols used to illustrate certain fluidynamic systems embodying the instant invention and several phases of operation of one such embodiment in FIGS. 23a, 23b, 25, 26, 27, and 28;

FIGS. 23a and 23b show, respectively, a schematic representation of one channel of certain embodiments of the instant invention shown and described herein, and a schematic representation of a channel of a more comprehensive and flexible system derived from said certain embodiments;

FIGS. 23c and 23d schematically illustrate two additional embodiments of the system, a channel of which is generally shown in FIG. 23a, these embodiments differing from that of FIG. 23a in that they show alternative purging methods and means which may be employed in lieu of dump cam 191, etc., of FIG. 23a in carrying out the instant invention;

FIG. 24 is a timing diagram illustrating the interrelationship of various major parts of a preferred embodiment of the invention at various phases of the operating cycle thereof;

FIGS. 25 through 28 are schematic illustrations of the major parts of certain embodiments of the instant invention as they are interrelated at four phases of operation;

FIG. 29 is a detailed side view in section of an automatic motorized typewriter of the prior art equipped with pulsators and other novel features adapted for carrying out another embodiment of the instant invention;

FIG. 30 is a perspective view of the automatic motorized typewriter shown in FIG. 29;

FIGS. 31 through 34 illustrate a pulsator of the kind employed in the automatic typewriter of FIG. 29;

FIGS. 35a through 38b illustrate a portion of the automatic typewriter of FIG. 29 at several stages of its operation;

FIG. 39 illustrates a "bellows valve," or "sealed valve," according to the instant invention which is adapted for use in fully-sealed fluidynamic systems according to the instant invention;

FIG. 40 is a schematic representation of one, fully-sealed channel of an embodiment of the instant invention;

FIGS. 41, 42, and 43 illustrate a "push-pull" pulsator, or "differential" pulsator, used in quasi-sealed embodiments of the instant invention shown in FIGS. 44 and 45;

FIG. 44 schematically illustrates a "quasi-sealed" embodiment of the instant invention as adapted for use, e.g., in a powered automatic typewriter after Buckley;

FIG. 45, taken in conjunction with FIG. 44, schematically illustrates a "quasi-sealed" embodiment of the instant invention which is adapted, e.g., for use in connection with textile machines, sewing equipments, etc.; and FIG. 46 shows a segment of perforated tape punched in accordance with the code employed in connection with the fluidynamic channels illustrated in FIGS. 44 and 45.

(7) THE INSTANT INVENTION COMPARED WITH BUCKLEY

Prior art devices over which the present invention is an improvement are typified by the Buckley patent cited hereinabove.

To facilitate comparison of the present invention with a device typical of the prior art, the present invention is shown and described herein as applied to an automatic motorized typewriter of the kind shown and described in Buckley.

The particulars in which one embodiment of the instant invention differs from the device of Buckley may be seen by comparison of FIG. 3 herein with the corresponding figure (FIG. 3) of Buckley. Such a comparison will show, generally, that in modifying Buckley according to the present invention: (a) constant head pump $h$ of Buckley is replaced by pulser bank, or respirator bank, 100 of the instant invention, (b) the conventional drive belt 50 of Buckley is replaced by the toothed timing belt 101 shown herein, and pulleys 51 and 52 of Buckley are correspondingly cogged, (c) clutch 64 of Buckley is replaced by cycle clutch 102, a similar cycle clutch being contained within respirator bank 100, and shown in detail in FIG. 21, (d) mechanical clutch control means 88 of Buckley is replaced by solenoid 103, arrester arm 104, etc., a similar electrical arresting means being provided to control the cycle clutch located in pump bank 100, (e) actuating vane 57 of Buckley is eliminated (in the embodiment of FIG. 3 herein but not in the embodiment of FIG. 30, (f) the interponent motors $e$ of Buckley are replaced by pulsators 105 of the instant invention, a different type of pulsator according to the instant invention being employed in the alternative embodiment shown in FIG. 30, (g) the tape reader $g$ of Buckley is replaced by tape reader 107 which is preferred for use with the instant invention, certain novel and inventive aspects of this preferred tape reader constituting the subject matter of copending U.S. patent application Ser. No. 397,988, and (h) an eccentric arm 106 is added to the device of Buckley to operate timing means constituting a part of the tape reader according to some embodiments of the instant invention. It will be understood that the list of comparative features stated in the previous sentence is in no way exhaustive, nor limitative of the present invention as claimed hereinbelow.

Further comparison of these figures, as elucidated by further study of the instant application, and of Buckley, will clearly show how the objects of the instant invention stated hereinabove are accomplished.

(8) CONVENTIONS

Before considering some embodiments of the instant invention in detail, it is noted that those reference characters from Buckley which will facilitate comparison have been preserved herein. All of such reference characters carried forward from Buckley comprise one or two digit numbers, lower case alphabetic letters, prime marks, or some combination of them. To distinguish these reference characters originating in Buckley from reference characters originating herein, all reference characters originating herein comprise three digit numbers, either alone or associated with alphabetic characters, decimal appendages, or the like. Thus, reference characters originating in Buckley may be recognized by the fact that they do not comprise three digit numbers. It is to be understood, however, that this convention is adopted only to facilitate reference to Buckley, and not to maintain a precise line of distinction between the present invention and the prior art. Thus, for instance, the cycle clutch of FIG. 21 is generally designated 128, and its parts are designated by three digit numbers, though its general construction and principles of operation are old and well known, being disclosed, for instance, at pages 140 and 141 of Ingenious Mechanisms for Designers and Inventors, volume I, edited by Franklin D. Jones, published by the Industrial Press, New York, tenth printing, 1954.

An additional group of specially adopted conventions employed herein are illustrated in FIG. 22. The upper portion of FIG. 22 shows certain schematic symbols used to represent the structural elements of systems embodying the instant invention. The lower portion of FIG. 22 shows certain schematic symbols which represent the state of operation of the elements with which they are associated.

FIG. 22a illustrates the symbol employed herein to represent a pulsator, i.e., a device for converting fluid pulsations into mechanical movement. The vibratory member, or movable member, is represented by that portion of the symbol of FIG. 22a extending upward and to the right from the upper, right-hand corner of the triangular portion of the symbol. Specific, but not limiting, examples of pulsators employed in embodiments of the instant invention are shown in FIGS. 10 through 12 and 31 through 34. A characteristic feature of the instant invention may be seen in the embodiments shown in these figures, viz., that the pulsators shown therein are sealed except for one inlet. Put differently, it is a characteristic feature of the instant invention that the pulsators employed in carrying out the invention are not equipped with check valves, as are ordinary bellows, for instance. In other words, the preferred form of pulsator according to the instant invention may be said to be "throughputless," since no flow of fluid into one orifice and out another, or "throughput," can take place, the device being equipped with but one orifice. Thus, "displacement flow," i.e., sufficient flow into such a pulsator as will fully expand its pouch, or receptacle, can take place, and sufficient outward flow therefrom as will permit its pouch, or receptacle, to fully close, can take place, but no net flow can take place through its single orifice. Because this preferred embodiment of the pulsator according to the instant invention is characterized by zero net flow, this embodiment may also be characterized as "flowtight."

FIG. 22b illustrates the schematic symbol employed herein to represent a pulser, i.e., a device for producing pulsations in a body of fluid. A preferred, but not limiting, form of pulser according to the instant invention is illustrated in FIGS. 17 through 20, wherein six of them are mounted in further apparatus for supporting them and driving them to produce pulsations in bodies of fluid with which they are connected by the orifice pipes shown extending upward at the top of FIG. 17. The encircled dot at one edge of the triangular portion of the symbol of FIG. 22b may be thought of as representative of the mechanical driving means whereby the pulser is caused to produce pulsations in its associated body of fluid. However, it is to be understood that the symbols of FIG. 22 are made somewhat representative of certain preferred embodiments of the instant invention merely for convenience, and that the configuration of these symbols is not to be taken as in any way limitative of the instant invention.

FIGS. 22c and 22d indicate that, in the diagrams in which the symbols of FIG. 22 are employed, a solid line is used to indicate a fluid conduit, while a dashed line is used to indicate a mechanical shaft.

FIG. 22e illustrates the symbol employed herein to represent means common to a plurality of information transmission channels and adapted to drain stored pulsation energy from all of those channels in order to "erase" any stored "memory" of information previously carried by those channels which might interfere with subsequent operation thereof. In both of the principal embodiments of the instant invention shown and described herein this common means comprises a longitudinally-developed cam 191 (FIGS. 7 and 8) which acts upon all of the modulator valves to "drain," or "purge," the information channels of any stored pulsation energy just prior to each reading. Thus, the common means employed in the embodiments of the instant invention described herein may be called a "common modulator control." It is particularly noted, however, that the common means employed in conjunction with the instant invention to drain the stored pulsation energy from the information transmission channels is not limited to means operating upon the modulators, such as the common modulator control cam shown and described herein. Rather, the instant invention, in its broadest sense, may also be carried out by the employment of common draining, or purging, means which are separate from and independent of, any of the modulators associated with the information transmission channels. For instance, the longitudinally-developed cam 191 shown in FIGS. 7 and 8 may be employed to operate a plurality of spring valves, one per information transmission channel, which are used only for draining, or purging, purposes, and are not also used for information input as are the modulator spring valves shown in FIGS. 7 and 8. Also, as will be apparent to those skilled in the art, the common means need not be a cam at all, nor need it be a single cam common to all channels. Many means not shown or described herein whereby the fluid-operated information transmission channels of the devices according to the invention may be drained, or purged, of stored pulsation energy, whether operating by controlling a modulator in each channel or operating independently of the modulators of the channels, will occur to those having ordinary skill in the art. Thus, it will be clear that the left-hand symbol of FIG. 22e may represent many devices including cam 191, etc., of FIG. 7, bleed 197 of FIG. 7.1, and check valve 198, 199 of FIG. 7.2, while the right-hand symbol of FIG. 22e represents only the purging means shown in FIGS. 7 and 8, and is not to be considered as limitative of the instant invention. The expressions "purger," "purger means," and "purging means" are employed herein to denote generically all means for purging the fluid-operated information transmission channels of the instant invention of stored pulsation energy, whether such means operate upon modulators in the information channels or otherwise, and whether such means are synchronous or asynchronous.

FIG. 22f illustrates the symbol employed herein to schematically represent manifolds to which a plurality of conduit sections and valves are connected in common, as shown, for instance, in FIG. 7.

FIG. 22g illustrates the symbol employed herein to schematically represent a permutation bar such as d of Buckley. This symbol is intended to be broadly interpreted, and in no way limits the instant invention to the employment of a particular type of permutation bar. The instant invention, as will be apparent to those having ordinary skill in the art, has far broader application than the field of typewriters, or sewing equipments, or the field of devices employing permutation bars.

FIG. 22h illustrates the symbol employed herein to schematically represent a cycle slutch, i.e., a device serving to transmit rotational motion to a controlled device, and by means of which the controlled device may be invariably stopped in a particular phase of its rotation, and started rotating from the same phase. An example of such a cycle clutch is the well-known "spring clutch"

employed in the embodiments of the instant invention shown and described herein, and illustrated in FIG. 21. While the symbol of FIG. 22h is schematically representative of the particular cycle clutch shown in FIG. 21 it will be understood that the instant invention is in no way limited to the employment of a particular cycle clutch, nor its application limited to devices necessarily employing cycle clutches.

FIG. 22i illustrates the symbol employed herein to schematically represent a valve, or modulator, whereby the fluid pressure in an information transmission channel may be modulated, a particular application of a group of such modulators to the reading of input information from paper tape being shown in FIGS. 7 and 8. While the symbol of FIG. 22i is schematically representative of the spring valve shown in FIG. 7, and constituting the subject matter of co-pending U.S. patent application Ser. No. 397,988, and while certain very considerable advantages are obtained by employing said spring valve in embodiments of the instant invention, it is to be understood that the instant invention is not limited to the employment of spring valves.

Figure 26:
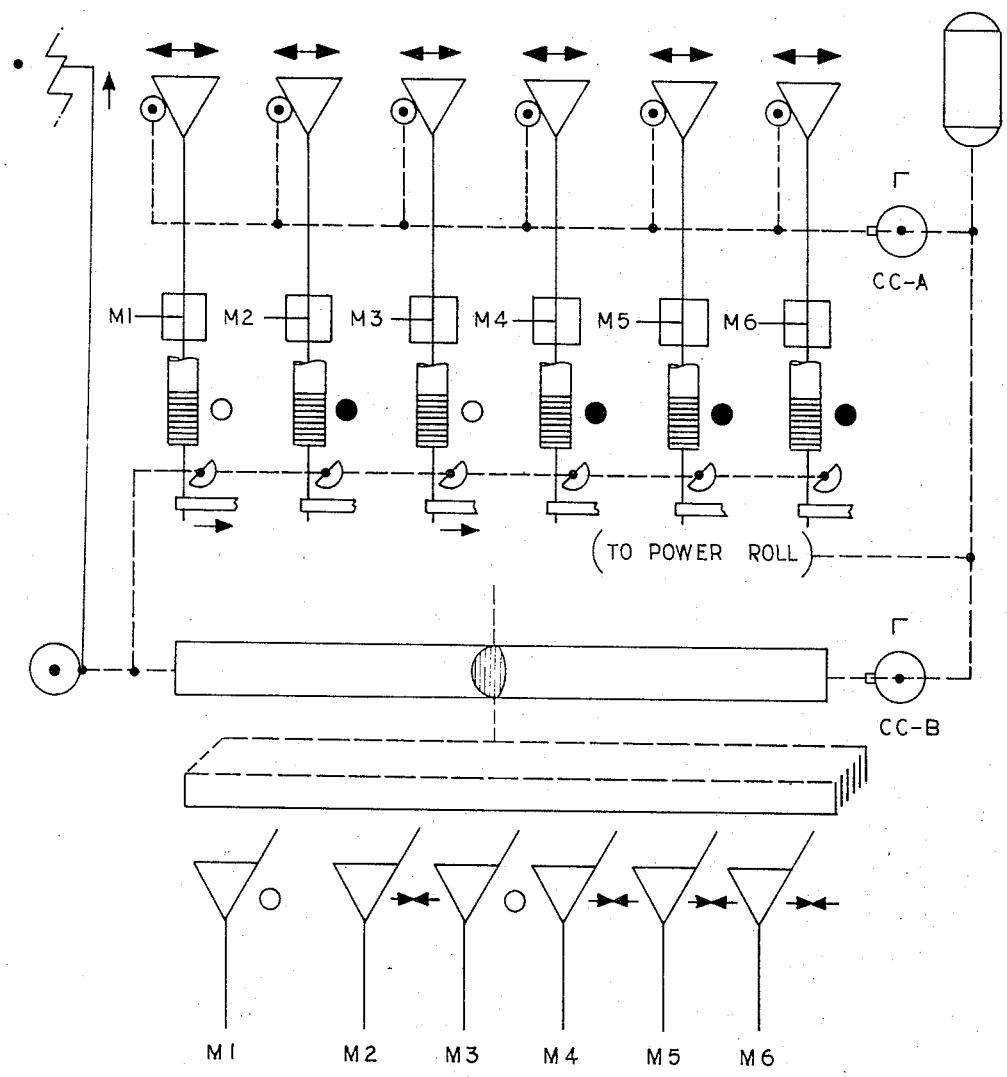

FIG. 22j illustrates a symbol employed herein to indicate that the element next to which the symbol is set is in its open state, e.g., this symbol is employed in FIG. 26 to denote that the leftmost pulsator is open, i.e., its "hinge" is at its maximum separation, and that the leftmost modulator is open, i.e., that its actuator (straight line) is deflected, thereby parting the turns of its spring.

Figure 27:
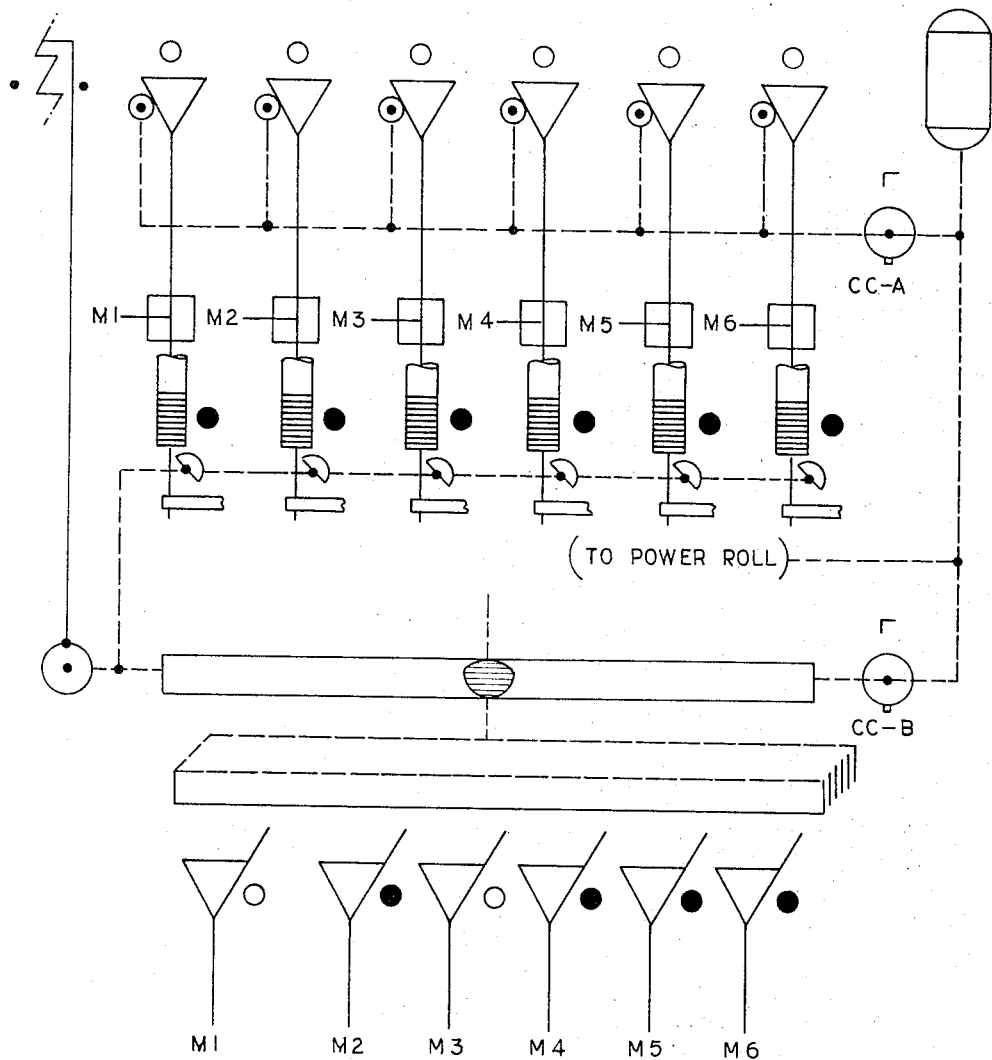
Figure 28:
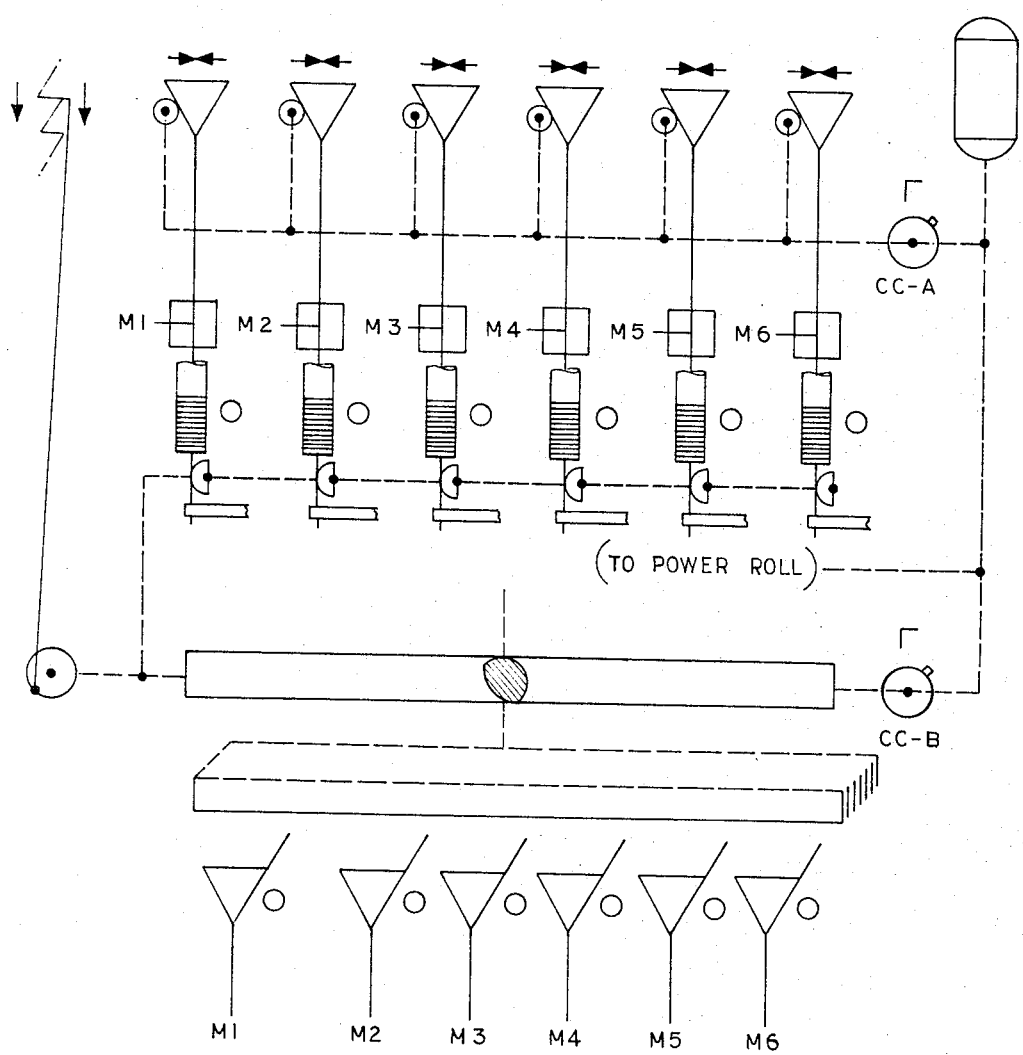

FIG. 22k illustrates the symbol employed herein to indicate that the element next to which it is set is closed, e.g., this symbol is employed in FIG. 27 to show that the rightmost pulsator is closed, i.e., that its 'hinge" is at minimum separation, and that the rightmost spring valve is closed, i.e., that its actuator (straight line) is undeflected and the turns of its spring in close, resilient contact.

FIG. 22l illustrates the symbol herein to indicate that the element next to it which it is set is opening, e.g., this symbol is used in FIG. 26 to show that all of the pulsers are opening, i.e., the branches of their "hinges" are receding from each other.

FIG. 22m illustrates the symbol employed herein to indicate that the element next to which it is set is closing, e.g., this symbol is employed in FIG. 26 to illustrate that the rightmost pulsator is closing, i.e., the branches of its "hinge" are approaching each other.

FIG. 22n illustrates the symbol used herein to schematically represent a bleed hole, or constriction, communicating from the interior of a conduit (horizontal line) to the space directly outside the conduit. See, for instance, constriction 197 in the manifold 189 of FIG. 7.1.

FIG. 22o illustrates the symbol used herein to schematically represent a check valve. While the parts of this symbol might be identified as body 201, conduit sections 202, and valve flap 203, the instant invention is not in any way limited to the use of a particular check valve. Also, the check valve represented by FIG. 22o may be integral with another device, as shown in FIG. 7.2, and yet be represented by the symbol of FIG. 22o separate from the symbol representing the other device.

FIG. 22p illustrates the symbol used herein to schematically represent the "bellows valve," or "sealed valve," an example of which is pictorially illustrated in FIG. 39.

FIG. 22q illustrates the symbol used herein to schematically represent a push-pull pulsator, an example of which is shown in FIGS. 41, 42, and 43.

FIG. 22r illustrates the symbol employed herein to indicate that an element next to which it is set is in its "neutral" state of operation, as, for instance, when tongue 231 of the push-pull pulsator of FIGS. 41, 42, and 43 is substantially equidistant from the two body members 228.

(9) THE CONSTRUCTION OF AN EMBODIMENT

As shown in FIGS. 3 and 30 and outlined in general hereinabove, both of the complete embodiments of the instant invention shown and described herein are illustrated by way of modification of the automatic powered typewriter of Buckley. Before describing the operation of these embodiments, reference will now be had to the specific elements added to the Buckley typewriter, or modifications made thereto, in constructing these embodiments.

The first such modification to be considered consists in the replacement of the single, constant-head pump $h$ of Buckley with the bank of pulsers, one per information transmission channel, which is generally designated 100 in FIG. 3. Pulser bank 100 is shown in detail in FIGS. 17 through 20.

(9.1) THE CONSTRUCTION OF THE PULSER BANK

As may be seen in FIGS. 17 and 18, pulser bank 100 comprises six pulsers 108, each of which comprises a part of an information transmission channel, there being six information transmission channels in the embodiments shown and described herein, as was the case in Buckley. It should be particularly noted that the specific pulser structure shown herein, as well as the pulser bank structure, is merely exemplary and in no way limitative of the instant invention.

Each pulser 108 generally comprises a pouch 109 and a pair of branches 110 and 111 which are themselves pivoted upon pin 115, and may be broadly described as together comprising a hinge. As indicated in FIGS. 17, 18, and 20, pouch 109 is generally composed of pliant material, this pliant material being substantially impervious to air (the operating fluid employed in the specific embodiments illustrated herein). Pouch 109 may be fabricated from certain rubber or plastic compounds having high resistance to fatigue failure resulting from repeated flexure, such compounds being well known to those having ordinary skill in the art. The smaller end of pouch 109 is secured in fluid tight manner to fixed branch 110, while the open end of pouch 109 is affixed in fluid tight manner to moving branch 111. Moving branch 111 has a single perforation to which is joined a short, rigid pipe stub 112, called herein the "orifice pipe."

Thus, considering pouch 109, branches 110 and 111, and orifice pipe 112, it may be seen that these parts together constitute a fluid tightly sealed receptacle the only opening to which is by means of orifice pipe 112.

As may further be seen from inspection of FIGS. 17 and 18, this receptacle may be expanded or contracted in volume by motion of movable branch 111 away from, or toward, fixed branch 110.

Thus, it will also be clear that reciprocation of movable branch 111 toward and away from, fixed branch 110 can produce pressure pulsations in a chamber, or load, to which orifice pipe 112 is connected by means of conduit 114.

Referring more generally to FIGS. 17 through 20, it may be seen that the remaining portions of pulser bank 100 are employed to support pulsers 108, and to reciprocate moving branches 111 with respect to fixed branches 110, whereby each pulser 108 produces pulsations in the fluid to which it is connected by means of its associated conduit 114. Thus, the outer shell of pulser bank 100 is composed of case 117 and cover 118, which are locked together by means of fasteners 119. Within case 117 is affixed a frame generally designated 120, this frame being equipped with longitudinal rails having slots which are adapted to receive the two extremities of hinge pins 115 of the pulsers 108. Affixed to the bottom of case 117 are a plurality of spring clips 121, these spring clips being adapted to engage the lower ends of fixed branches 110 when the extremities of hinge pins 115 are seated in the notches in the rail portions of frame 120, thus securing the fixed branches of pulsers 108 rigidly in place within the shell of the pulser bank. As will be apparent to those having ordinary skill in the art, the pulsers are maintained in place in the case 117 by means of cover 118.

Passing through frame 120, but separate therefrom, is reciprocating arm 122. Reciprocating arm 122 is maintained free to reciprocate to a limited extent by means of slots 124 in its body, which slots engage bearing pins 123 supported by tabs affixed to the bottom of case 117.

As may be clearly seen in FIG. 18, the moving branch of each pulser 108 is equipped with a pivot pin 116 which engages a corresponding notch in the upper edge of reciprocating arm 122.

Thus, it may be seen that reciprocation of arm 122 causes the expansion and contraction of the receptacles of pulsers 108, and is capable of causing pulsations in the fluid in chambers, or loads, to which the individual pulsers are connected by means of conduits 114.

As may best be seen in FIG. 18, the reciprocation of reciprocating arm 122 is brought about by coaction of cam follower pin 125, which is affixed to arm 122, with cam track 126 formed in a cylindrical member attached to the outward end of shaft 127.

As will be apparent to those skilled in the art, one may properly select the configuration of cam track 126 so as to produce pressure fluctuations of the type broadly and generally shown in FIG. 9 in the various conduits connected to pulsers 108, except, of course, when such conduits are vented to a drain pressure, e.g., atmospheric pressure, by modulators or purgers. As may be seen from FIGS. 17 and 18, cam track 126 produces positive stroke action in both directions of reciprocation of arm 122, and one cycle of pressure fluctuations as generally shown in FIG. 9 is produced with each revolution of shaft 127.

As is clear from FIGS. 17 and 18, shaft 127 is powered by cog wheel 52 (FIG. 3) which is in turn driven by toothed belt 101 (FIG. 3). Cog wheel 52, however, does not drive shaft 127 directly, but actually drives shaft 129 directly. Interposed between shafts 127 and 129 is a spring clutch, or cycle clutch, of the type shown and described elsewhere herein. Spring clutch 128 is normally in its engaged state, and directly couples shaft 129 to shaft 127. When, however, solenoid 130 causes arm 131 to engage the detent shown on the outside of the clutch case, then shaft 127 is disengaged from shaft 129, thereby allowing shaft 129 to run free, and at the same time locking shaft 127 in a predetermined phase of rotation. When arm 131 is released by solenoid 130 and withdrawn by spring 132, shaft 129 is then re-engaged with shaft 127 and shaft 127 again commences rotation, starting in the particular phase of rotation in which it was locked by arm 131. As will be apparent to those having ordinary skill in the art, the cycle clutch is employed because of the desirability of starting and stopping all coacting mechanical parts of the typewriter mechanism in predetermined phases of their operation.

Thus, the employment of cycle clutch 128 along with cycle clutch 102 (FIG. 3) ensures that keystroke cam 60 and pulser bank 100 will be stopped and started always in the same phase of their operation when switch 133 is actuated by means of control key $b^9$. Switch 133 may be a switch of the well-known snap-action variety, and may be supplied with power for energization of solenoids 103 (FIG. 3) and 130 (FIG. 19) from a source not shown, by means of conductors generally indicated as 134. Switch 133 may then be constructed and arranged to de-energize solenoids 103 and 104 via conductors generally represented as 135 and 136 (these numerals may, of course, represent suitable conductor pairs) when the actuator of switch 133 is maintained depressed by control key $b^9$.

As shown in FIGS. 20 and 21 of Buckley, and now described in connection therewith, depression of key $b^9$, and locking it in the depressed position by means of key extension $b^8$, causes the automatic mode of operation to obtain. Similarly in the instant embodiments, depression of $b^9$ opens both circuits of switch 133, and thereby de-energizes solenoids 103 and 130, and releases clutches 102 and 128, thereby coupling power for automatic operation to keystroke cam 60, etc., and pulsers 108.

Since all of the related mechanism of Buckley is present in the instant embodiments, with the exception of clutch 64 and arm 88, key $b^9$ will be released at some subsequent time either by operator manipulation of key extension $b^8$ or by automatic tape operation as described in Buckley. In either event, switch 133 will be closed upon release of key $b^9$, thereby energizing solenoids 103 and 130, locking out pulsers 108, keystroke cam 60, etc., in predetermined phases of their operation, and rendering the typewriter available for manual typewriting operation.

As will be apparent to those having ordinary skill in the art, the means described hereinabove for engaging or disengaging cycle clutches 102 and 128 may be replaced with suitable alternative expedients, some of them entirely non-electrical, since this particular part of the instant embodiments constitutes no part of the present invention. Before concluding consideration of the pulser bank 100, it should be noted that, as seen in FIG. 3, cog wheel 52 is powered by toothed belt 101, which is in turn powered by cog wheel 51 attached directly to the shaft of motor 22. Keystroke cam 60, along with the tape advance eccentric arm 67 and the purger drive cogged belt 106, is driven by worm 62 which is also directly coupled to the shaft of motor 22. Thus, it may be seen that input shaft 137 of spring clutch 102 and input shaft 129 of spring clutch 128 are positively maintained in phase synchronism by their common relationship to motor shaft 25. Since clutches 102 and 128 are so constructed and arranged as to start and stop their loads in predetermined phase relation, it follows that the phase relationship between the cycle of pulsers 108, the operation of keystroke cam 60, the operation of the tape feed means, and the operation of the purger, will remain fixed in the embodiments shown and described herein, despite successive startings and stoppings of the automatic typewriting mechanism.

(9.2) *The Construction of the Cycle Clutches.*

Spring clutches, or cycle clutches, 102 and 128 are substantially identical in construction, though of different relative size, as may be seen by inspection of FIGS. 3 and 17 through 20. Since these spring clutches are old and well known, as pointed out hereinabove, they will be discussed in only sufficient detail to enable clear understanding of the instant embodiments.

FIG. 21 shows the construction of spring clutch, or cycle clutch 128. As may be seen in FIG. 21, spring clutch 128 comprises four major parts, viz., case 138, driving element 140, driven element 139, and spring 143. Case 138 is physically separate from driven element 139 and driving element 140, and would be free to rotate about the driving and driven elements but for the coupling between it and the driven element affected by spring 143. Spring 143 is of square cross-section for maximum frictional gripping contact upon the protruding portions of 139 and 140, and has a first outwardly projecting end 145 which engages a bore in case 138, and a second longitudinally projecting end 146 which engages a bore in 139. Thus, case 138 is resiliently coupled to driven element 139. As may be seen in FIG. 21, driven element 139 is affixed to an end of shaft 127 by means of set screw 141, or the like; while driving element 140 is affixed to an end of shaft 129 by pin 142, or the like. A bearing 147 is provided in frame 120 (FIG. 18), this bearing providing a smooth surface whereagainst the left-hand ends of case 138 and driven element 139 (as seen in FIG. 21) may freely rotate. Shaft 127 is maintained in bearing 147 against longitudinal displacement by retaining ring 148, sufficient clearance being provided between retaining ring 148 and the left ends of 138 and 139 to allow free rotation of shaft 127 in bearing 147. While it is presumed that the supporting structure for clutch 128 as shown in FIGS. 17 and 18 is sufficient to maintain the parts of clutch 128 in good, non-binding alingment, it will be obvious to those skilled in the art that additional aligning means may be provided without the exercise of invention, e.g., engages a corresponding cylindrical, axially-symmetrical bore in the inner end of 139, said bore and said protrusion acting together as a freely operating bearing.

The operation of this general type of spring clutch is described in the disclosure referred to hereinabove. Briefly, however, it will be seen that spring clutch 128 operates as follows. Assuming that shaft 129 is rotating clockwise as viewed from the right-hand side of FIG. 21, that detent 144 is not engaged by arm 131 (FIG. 19), and that spring 143 firmly engages the protruding portions of 139 and 140 in its normal state of flexure, it follows that any tendency of 140, the driving member, to slip with respect to spring 143 produces longitudinal forces in the turns of spring 143 which tend to compress spring 143 in diameter, therefore gripping 140 yet more tightly than flexure of spring 143 alone provides for. Thus, spring 143 couples 139 to 140 when detent 144 is not engaged by arm 131 (see FIG. 19). When, however, detent 144 is engaged by arm 131, then end 145 of spring 143 is fixed in position. Since this is so, any tendency to turn 139 produces unwinding forces in spring 143, thereby expanding spring 143 and disengaging driven member 139. Since arm 131 always stops detent 144 at the same angular position, and since the angular "takeup" between ends 145 and 146 of spring 143 in disengagement always remains substantially the same for every operation of the clutch, it follows that driven member 139 is always stopped, and started again on re-engagement, in approximately the same angle, or phase, of its rotation.

(9.3) THE CONSTRUCTION OF THE PERMUTATION BAR DRIVE MEANS (PULSATORS, ETC.).

An additional modification of the Buckley typewriter which has been made in providing the embodiments of the instant invention shown and described herein is the substitution of the permutation bar drive means shown in part in the lower portions of FIGS. 3 and 30 for the permutation bar drive means similarly shown in part in FIG. 3 of Buckley.

It is noted that the convention adopted in Buckley of showing only parts of the operating mechanism in his general pictorial figure, FIG. 3, is also adopted herein. Thus, only three conduits 114 are shown extending from pulser bank 100 to reader 107 in both FIGS. 3 and 30, though the device according to the invention actually employs six such conduits, corresponding to the six channels of the paper tape from which the device of the invention is adapted to transcribe typewritten text. Similarly, only three conduits 149 (corresponding to $g^4$ of Buckley) are shown in FIGS. 3 and 30 herein, though six such conduits will be found in the actual device according to the invention, corresponding, again, to the number of channels of the punched paper tape employed therewith. Also, though only three pulsators 105 are shown in FIG. 3 herein, it will be recognized by those having ordinary skill in the art that the complete structure of the embodiment of the instant invention shown in FIG. 3 will include six pulsators, one connected to each of the six conduits 149 and driving one of the permutation bars $d$. This convention of eliminating certain repetitive elements from the drawings for clarity also applies in other drawings found herein, e.g., FIG. 5.

Since the embodiments of the instant invention shown and described in FIGS. 3 and 30 differ only in the permutation bar drive means employed, these two embodiments, and particularly the distinctions therebetween, will now be described.

The direct permutation bar drive embodiment of the instant invention is shown in pictorial view in FIG. 3. It is a characteristic feature of this embodiment that the pulsators 105 are the only means employed to displace permutation bars $d$. That is, the permutation bar driving means including cam 57ª, notch 59, vane 57, etc., found in Buckley (FIG. 3), and also in the second embodiment of the instant invention illustrated herein (FIG. 30), is completely missing from this first embodiment (FIG. 3). Stated as briefly as possible, the characteristic feature of this embodiment is that the permutation bars $d$ are directly driven by their associated pulsators 105. For this reason, this first embodiment (FIG. 3) will hereinafter be called the "direct drive" embodiment.

The cam-powered permutation bar embodiment of the instant invention shown and described herein is illustrated pictorially in FIG. 30. As may be seen in FIG. 30, this embodiment of the instant invention employs the same cam (57ª) and vane (57) arrangement to supply power to the permutation bars $d$ which is employed in Buckley (FIG. 3). For this reason, this second embodiment (FIG. 30) will hereinafter be called the cam-powered embodiment. In this cam-powered embodiment, as may be seen in FIG. 30, pulsators 150 serve to permutatively lock permutation bars $d$ in their leftward positions after all of the permutation bars $d$ have been leftwardly impelled by vane 57 as in Buckley. Thus, pulsators 150 in the cam powered embodiment of the instant invention operate in a manner more closely analogous to the air motors $e$ of Buckley than do the pulsators 105 of the direct drive embodiment.

(9.3.1) IN THE DIRECT DRIVE EMBODIMENT (FIG. 3)

(9.3.1.1) THE DIRECT DRIVE PULSATOR

Before describing the direct drive embodiment in detail, reference is now had to FIGS. 10 through 12 which show in detail the structure of the pulsators employed in the direct drive embodiment.

As seen in these figures, pulsator 105 is comprised of three principal elements, viz., pouch 151, fixed element, or body, 152, and movable, or vibratory member 153. Movable member 153, also called the vibrator, is pivoted to body 152 along an axis generally shown as 154. Pouch 151 is secured at its smaller end to movable member 153 and is fluid-tightly closed at that end. At its other, or larger, end, pouch 151 is fluid-tightly sealed about its periphery to body 152, the seal between pouch 151 and body 152 surrounding a dished portion 159 of body 152. Dished portion 159 is equipped with orifice pipe 160, which is the sole means of communication with the interior of the receptacle formed by pouch 151, its closure attached to vibrator 153, and body 152. As indicated in FIGS. 10 and 11, pouch 151 is comprised of pliant, fluid-tight material. The material from which pouch 151 is fabricated may, for instance, be one of the materials from which the pouches 109 of pulsers 108 may be fabricated, as listed hereinabove. As particularly shown in FIG. 11, the therein leftwardly extending lower portion of vibrator 153 is provided with a hook engaging the lower end of spring 155; the upper end of spring 155 being secured to a tongue 156 of body 152. By this means vibrator 153 is maintained in its "open" position, i.e., the position in which its upper portion is most remote from body 152, when the receptacle is unpressurized. When, however, a sufficient vacuum is drawn in the receptacle through orifice pipe 160, vibrator 153 is drawn to its leftmost position, as viewed with vibrator 153 on the right side of pulsator 105, i.e., the closed position of the hinge formed by 152 and 153 wherein 153 lies closely adjacent 152. Termination of this vacuum will, of course, permit spring 155 to again urge vibrator 153 into its rightmost position as seen in FIG. 11.

(9.3.1.2) DIRECT DRIVE OPERATION

In the direct drive embodiment shown in FIG. 3, each pulsator 105 has a conduit 149 connected to its orifice pipe 160. In a manner which will hereinafter be described, conduits 149 convey to their corresponding pulsators 105 certain of the regularly recurring fluid pulsations from conduits 114, certain of the regularly recurring pulsations of the fluid in conduits 114 being suppressed from the sets of pulsations occurring in conduits 149 in accordance with information read from paper tape by reader 107. Thus, it may be seen that the vibrators 153 of pulsators 105 (FIG. 3) operate in synchronism with the pulsations of their corresponding pulsers 108 located in pulser bank 100, except that certain of the operations are suppressed by tape reader means 107, thereby modulating the pattern of operations, or vibrations, of the six vibrators 153 found in the direct drive embodiment in accordance with information read by reader 107 from paper tape carried on drums 41 and 42 (FIG. 3).

As shown in FIG. 11, the upper end of each vibrator 153 engages a slot between two lugs 161 located on the lower edge of its corresponding permutation bar *d*. Thus, in the direct drive embodiment, each one of the six permutation bars *d* is reciprocated by its associated pulsator 105. This reciprocation of each permutation bar *d* by its corresponding pulsator is, of course, rendered possible by the fact that tabs 157 of body portion 152 of each pulsator are secured to a frame member 158 of the typewriter to which the invention is applied. As will be apparent to those skilled in the art, each one of the six permutation bars *d* in the direct drive embodiment of FIG. 3 will have one, and only one, set of lugs 161 on its lower edge, this set of lugs defining one slot which coacts with the vibrator 153 of one pulsator 105. Put differently, each one of the six permutation bars *d* employed in the direct drive embodiment has associated therewith one pulsator 105, the associated pulsator 105 serving during automatic operation of the typewriter to which the invention is applied to regularly reciprocate the permutation bar except when one such reciprocation is suppressed in response to the reading of paper tape passing through reader 107. Thus, as shown in FIGS. 13a through 16b, the two frontmost permutation bars of the typewriter may be called *d'* and *d''*, and *d'* will have but two lugs 161' defining a slot on its lower edge, the vibrator of one pulsator 105' engaged in a slot formed between lugs 161'; at the same time, permutation bar *d''* will have but two lugs, 161'', depending from its lower edge and forming a slot therebetween, which slot will be engaged by the vibrator of pulsator 105''. These reciprocations will be brought about by pulsations in the pressure within the receptacles of the six pulsators 105, or absence of the same, restoring force for the vibrators 153 of these pulsators being provided by return springs 155 and also by permutation bar return springs 48 as shown in FIG. 3.

From the above it may be seen that the direct drive embodiment is characterized by six pulsators 105 each of which is associated in reciprocatory driving relation with one permutation bar *d*, the pulsators 105 causing the permutation bars *d* to regularly reciprocate from left to right in the typewriter in synchronism with the regularly recurring pulsations produced at pulsers 108, except when such regular reciprocations are suppressed by the tape-reading action of reader 107, to be described hereinafter.

(9.3.2) THE CAM-POWERED EMBODIMENT
(FIG. 30)

(9.3.2.1) THE CAM-POWERED DRIVE PULSATOR

Considering now the cam-powered embodiment (FIG. 30), the pulsator 150 employed in this embodiment and shown in FIGS. 31 through 34 will now be described.

Figure 34:
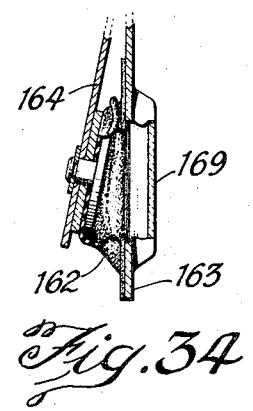

As may be seen in FIGS. 31 through 34, pulsator 150 generally comprises three main elements, viz., pouch 162, body, or fixed element, 163, and vibrator, or movable element 164. Pouch 162 is comprised of pliant material, and is similar in construction and operation to pouch 151 of pulsator 105. As shown in FIG. 34, pouch 162, body 163 (including "dish" 169), and vibrator 164 together form an expansible receptacle, as do elements 151, 152, and 153 of pulsator 105. Movable member, or vibrator, 164 is pivoted to body 163 along an axis generally designated as 165. The receptacle formed within the pouch, body, and vibrator is, like the receptacle of pulsator 105, equipped with a single orifice pipe 173 which is adapted to have connected to it one of the efferent information conduits 149. There will, of course, be six such efferent information conduits 149 in a complete realization of the present cam-powered embodiments, and six pulsators 150, one connected to each efferent information conduit 149. Thus, it may be seen that pulsators 150 are structurally similar to pulsators 105, and reference is had to the text hereinabove describing the pulsators 105 (FIGS. 10 through 12) for further discussion of the similar structural details. Thus, it will be seen that spring 166 of pulsator 105 is comparable in function to spring 155 of pulsator 105, bar 172 is comparable in function to tongue 156 of pulsator 105, mounting lugs 168 are comparable to similar mounting lugs 157, etc.

Pulsator 105 differs from pulsator 150, however, in that, as may be seen in FIG. 30, pulsator 150 serves only to lock selected ones of permutation bars *d* in their leftward position after they have been leftwardly urged by vane 57, this action being similar to the action of air motors *e* of Buckley. As seen in detail in FIG. 32, vibrator 164 of pulsator 150, in order to accomplish this permutation bar locking action, is equipped with latch arm 170. Latch arm 170 is adapted to coact with a lug 171 located on the lower surface of its corresponding permutation bar *d*. As will be shown by comparison of FIGS. 10 through 12 with FIGS. 31 through 34, evacuation of the receptacle of pulsator 150 will cause latch arm 170 to ascend into latching position, just as the evacuation of the receptacle of pulsator 105 will cause vibrator 153 to draw corresponding permutation bar *d* to the left. Subsequently, as may be seen in FIG. 24, the permutation bars *d* which are latched to the left by latch arms 170 will remain so latched until exhaust, which occurs well after the maximum depression of key *k*, since the vacuum in the receptacle of the pulsators corresponding to these latched permutation bars remains substantially steady until the commencement of the exhaust portion of the basic (pulser) operation cycle.

Going now to another specific feature of the cam powered embodiment, vane-operating cam 174 is provided at the right-hand end of longitudinally-developed cam 60. As may be seen, for instance, in FIG. 35a, vane-operating cam 174 has substantially the contour of keystroke cam 60, but is delayed with respect to keystroke cam 60 by approximately ninety degrees. Thus, vane-operating cam 174 brings about the full left displacement of all of the permutation bars in the cam powered embodiment at approximately forty-five degrees of the basic (pulser) operating cycle as shown in FIG. 24. Due, however, to the clearance between lugs 171 and their corresponding latch arms 170, when the permutation bars are at full left stroke, it will be apparent to those having ordinary skill in the art that all of the latch arms 170 will be free of lugs 171 slightly before the commencement of the shaded reading time portion of the basic cycle. Thus, there will be no interference between latch arms 170 and lugs 171 on the upstroke of latches 170. It is noted that the cam contours shown herein are schematic only, the development of more sophisticated cam contours to insure smooth coaction of lugs 171 and latch arms 170, inter alia, being within the scope of one having ordinary skill in the art.

An additional structural feature of the cam powered embodiment lies in the balance of relative strength between each spring 48 and its corresponding spring 166, i.e., this balance is so determined that spring 166 overcomes spring 48 expect when the receptacle of the modulator 150 is evacuated, thus ensuring that shortly after the commencement of the exhaust cycle (see FIG. 24) those latch arms 170 which were maintained in raised position by the exacuation of their associated receptacles will have been fully drawn down clear of the path of travel of the corresponding lug 171. Thus, all of the latch arms 170 will be fully drawn down early in the exhaust portion of the basic operating cycle (FIG. 24), and all of the lugs 171 will be beyond and to the left of the latch arms 170 early in the intake portion of the basic cycle, so that there will be no interference with the reading action by way of "memory" of the previous state of any channel or by way of interference of any lug 171 with its corresponding latch arm 170.

(9.3.2.2) CAM-POWERED OPERATION

Referring now to FIGS. 35a through 38b, the sequence of operation of the cam-powered embodiment may be seen. FIGS. 35a and 35b indicate the state of the permutation bar drive mechanism of the cam-powered embodiment at about 315° of the basic cycle (FIG. 24). At this time all of the permutation bars are in their full rightward position in response to the urging of springs 48, the latch arms 170 which operated in the previous cycle having been withdrawn from engagement with their corresponding lugs 171 by springs 166 at the termination of the dwell portion of the basic operating cycle. All of the key bars $k$ are held in full upward position by keystroke cam 60. In FIGS. 36a and 36b the permutation bar drive mechanism of the cam-powered embodiment is shown at about 45° of the basic cycle (FIG. 24). At this time all of the permutation bars $d$ are fully drawn to the left by vane 57, the latch arms 170 of the pulsators selected by reader 107 (as shown in these figures pulsator 150″) have begun their ascent, and key bars $k$ remain at their highest elevation. As may be noted in FIG. 36a, clearance is provided between the upper edges of the permutation bars $d$ and the key bars $k$ when the key bars are in their highest elevation, thus permitting the return of the permutation bars $d$ to either latching engagement with latch arms 170 or "home" position before selecting engagement of key bars $k$ with the tops of the permutation bars. In FIGS. 37a and 37b is shown the state of the permutation bar operating mechanism at about 135° of the basic cycle (FIG. 24). At this time the single key bar $k$ selected by the particular permutation of permutation bars $d$ then existing is fully depressed, the latch arms 170 of the selected pulsators 150 are maintained upward, engaging corresponding lugs 171 and holding the corresponding permutation bar ($d''$ in this case) locked in leftward position, while the permutation bars ($d'$ in this case) not so latched are in "home" position. FIGS. 38a and 38b show the permutation bar operating mechanism of the cam powered embodiment at about 225° of the basic cycle (FIG. 24). At this time, as in FIGS. 35a and 35b, all of the latch arms 170 are withdrawn, since the purging of each channel, or bleeding to atmosphere, is being carried out by the purger cam, and the absence of vacuum in the receptacles of all of the pulsators 150 has permitted the springs 166 to withdraw all those not left withdrawn at the previous reading time. Thus, all of the permutation bars $d$ are in "home" position, and the permutation bars and information channels are purged of "memory" and ready for the next reading action.

The distinction between the direct drive and cam-powered embodiments having been set forth in detail, no further reference to the structures specific to these embodiments will be necessary except by way of general statements relating to the overall operation of the device of the invention.

(9.4) THE READER

(9.4.1) CAM-OPERATED PURGING

Referring now to FIGS. 3 through 8, the construction and operation of the cam-operated purging embodiment of reader 107 will be described.

Reader 107 comprises six spring valves of the type shown and described in my copending U.S. patent application Ser. No. 397,988 and the tape guides, actuating levers, drive sprocket, etc., whereby these six spring valves are operated in accordance with successive codes punched in the corresponding channels of a six-channel perforated tape. As shown in FIG. 7, perforated tape 175 is fed over platform 176 under sprocket drum 178 which is equipped with lugs adapted to coact with the sprocket holes in the six-channel perforated tape. The six-channel perforated tape is fed from supply reel 41 (FIG. 3) and passes under the inclined guide at the left end of the reader as shown in FIG. 7 onto takeup spool 42 (FIG. 3). As shown in FIG. 7, tape 175 passes between platform 176 and tape guide 177. Tape guide 177 is provided in its horizontal portion with two openings, the first of these openings permitting sprocket drum 178 to contact the tape and its sprocket holes and to advance the tape from code to code for successive reading thereof, and the second opening permitting fingers 183 of actuating arms 180 to sense the holes comprising said codes. As seen in FIG. 7, it is assumed that each of the actuating arms 180 is sensing a hole in its associated channel of perforated tape 175, and, therefore, only the frontmost actuating arm, spring valve, and associated apparatus may be seen in that figure. It will be seen by further inspection of FIG. 7 that the cutaway portion of tape 175 includes a single code hole into which finger 183 has dropped into substantial contact with platform 176.

Having considered tape 175 and its manner of advancement, it is now noted that within cover 179 the mechanism of the reader may be generally categorized as follows: one sprocket drum 178 as described above, one purger cam 191, one manifold 189, six actuator arms 180 (all pivotally mounted on post 181), and six spring valves 185, 186, 187, 188.

Each actuator arm 180, pivoted about post 181, has a downwardly projecting finger 183 adapted to engage code holes in perforated tape 175 as shown in FIG. 7. Also, each actuator arm 180 is downwardly biased by a coil spring 182, the lower end of which is affixed to a member secured to case 179. Thus, each actuator arm 180 may generally occupy one of two positions, an upper position when finger 183 is in contact with the web of perforated tape 175, or a lower position when (as shown in FIG. 7) finger 183 has dropped into contact with the top of platform 176 through a code hole in the perforated paper tape 175 being read. As may be seen in FIG. 8, each actuator arm 180 has a longitudinal hole, or slot, 184 in its upper overturned portion. As also shown in FIG. 8, the actuator 185 of the spring valve associated with each channel passes through slot 184 in the arm 180 associated with the same channel. Each spring valve is comprised of a cap 186 carrying an actuator 185, a spring 187, and a hollow header 188. Cap 186 is affixed in one end of spring 187 and serves to seal that end of spring 187 and to carry actuator 185. Header 188 is sealed into the opposite end of spring 187 and contains a bore which communicates from the interior of spring 187 to the interior of manifold 189. Actuator arm 180 and the spring valve are so constructed and arranged that when actuator arm 180 is in its upper position, no spring deflecting force is impressed upon actuator 185 by the edges of slot 184, and, thus, the adjacent turns of spring 187 are maintained tightly in contact with each other by the resilience of the spring material and the spring valve is closed against passage of fluid between its turns and thus through the bore of header 188 into the associated chamber in manifold 189. On the other hand, when finger 183 passes through a code perforation and actuator arm 180 drops to its lower position, actuator 185 is deflected and the turns of spring 187 spread, thereby permitting flow of operating fluid (air in the instant embodiment) between the turns of 187 and through the bore of header 188 into the associated chamber of manifold 189.

It should be noted at this point that the interior of the manifold includes six separate chambers 196, one per tape channel. Each of these six separate chambers is sealed from ambient atmospheric pressure, the only access thereto being by way of header 188, orifice pipe 194, and orifice pipe 195. Each chamber has a power conduit 114 attached to its orifice pipe 194, an efferent information conduit 149 attached to its orifice pipe 195, and its associated spring valve header 188 also communicating with it as described above.

Thus, it may be seen that each information channel of the device of the invention includes a power conduit 114 coming from a pulser 108 in pulser bank 100, a chamber in manifold 189 to which said power conduit communicates, an efferent information conduit communicating from said chamber to the expansible receptacle of a pulsator, and a spring valve communicating with said chamber by means of a header 188, said spring valve being actuated in accordance with the code punches in a corresponding channel of the punched paper tape 175 being read by means of actuator arm 180.

The final major element of reader 107 to be considered is purger cam 191 (see FIGS. 7 and 8). Purger cam 191 is mounted upon and rotated by shaft 192 which is itself rotated in synchronism with the rotation of keystroke cam 60 (FIG. 3) by means of a cog belt 106. Cog belt 106 coacts with a toothed pulley 207 mounted on a stub shaft of the keystroke cam 60 and a toothed pulley 193 secured to shaft 192. As may best be seen in FIG. 7, purger cam 191 is so shaped that during approximately one half of its rotation its outer face will be in contact with the actuators 185 of all six spring valves, deflecting these actuators and thereby holding the spring valves open for approximately fifty percent of the operating cycle of the device of the invention; that is, the entire exhaust arc of the time diagram of FIG. 24.

It will be understood from the above that, while only two conduits 114 and 149 are shown in FIG. 7 for ease of comprehension, window 190 in the back of case 179 will, in actual practice, pass six efferent information conduits 149 and six power conduits 114, these conduits then being directed to their associated pulsators and pulsers as shown generally in FIG. 3.

It will further be understood by those having ordinary skill in the art, upon consideration of the embodiment of the instant invention a single channel of which is shown in FIG. 40, and comparison of FIG. 23a therewith, that in carrying out the aspect of the instant invention disclosed in FIG. 40 the unsealed spring valves 185, 186, 187, 188 of FIG. 7 will be replaced with bellows valves 219 (FIG. 39), and the manifold 189 of FIG. 7 replaced with manifold 223 schematically shown in FIG. 40, reader 107 as used in the embodiment of FIG. 40 being otherwise substantially unmodified.

(9.4.2) BLEEDER PURGING

FIG. 7.1 illustrates an alternative embodiment of reader 107, which differs from the reader of FIGS. 7 and 8 only by the employment of a different system for purging information from the information transmission channels. In the embodiment of FIG. 7.1 spurious pressure signals are purged by bleeding each chamber in manifold 189 via a bleeder hole 197. A schematic symbol for a bleeder is shown in FIG. 22n, and a schematic diagram of one channel of an embodiment of the present invention using bleeder purging is shown in FIG. 23c.

(9.4.3) CHECK VALVE PURGING

FIG. 7.2 illustrates a second alternative embodiment of reader 107, which differs from the reader of FIGS. 7 and 8 only in that purging is accomplished by a check valve 198, 199 in each chamber of manifold 189. A schematic symbol for this check valve and a single channel using it are found in FIGS. 22o and 23d.

While the three types of purgers described hereinabove have been shown as comprising part of the tape reader, the present invention also contemplates as within its scope the inclusion of the purger in other parts of the channel than the reader. Indeed, certain further embodiments of the instant invention described hereinbelow have no purger, in the sense of a valve to atmosphere.

(9.5) DEFINITIONS OF TERMS USED HEREIN

While a plurality of terms pertinent to the instant invention are defined operationally, or in part, in other parts of the instant specification, the following definitions, or additional definitions, of pertinent terms will further aid in clearly explaining and defining the scope and nature of the invention:

CARRIER PULSE TRAIN and CARRIER TRAIN, as those terms are employed herein, denote a continuous, uninterrupted train of pulses in the operating fluid of a fluidynamic device, or some part thereof, i.e., a train of pulses recurring at each passage of a substantially fixed interval. Such a cyclical pulse train in a fluidynamic device is analogous to an unmodulated carrier wave in radio broadcasting practice. An unmodulated, or continuous, pulser produces, by definition, a carrier pulse train, or carrier train.

CARRIER PULSE TRAIN GENERATOR and CARRIER TRAIN GENERATOR, as employed herein, are synonymous with continuous pulser and unmodulated pulser.

The verb COMMUNICATE, as employed herein, embraces both valving and bleeding (cf., FIGS. 7, 7.1, and 7.2, and related text).

The term CONDUIT, as employed herein, denotes any means for constraining a body of fluid to stand in, or flow along, a path, and is not limited to means for containing bodies of fluid characterized by non-zero net flow. E.g., efferent information conduits 149 (FIG. 3) are characterized as conduits even though the net flow therein must be substantially zero since they are terminated in flowtight devices.

Conduit is synonymous with CONDUIT MEANS herein. Sections of tubing or the like, or other devices serving as part or all of a conduit, e.g., interrupters 102 through 115 of applicant's Luxembourgois Patent referred to hereinabove, are termed CONDUIT BRANCHES, or CONDUIT SECTIONS herein. Thus, a conduit as defined herein may include an interrupter or other device, one or more lengths of tubing, or any combination thereof, in addition to pulsers, pulsators, etc.

A CONTINUOUS PULSER, as the term is employed herein, is a pulser, q.v., which produces continuous, uninterrupted trains of pulsations, as compared, e.g., with the device shown in sheet 8 of U.S. Patent No. 2,894,614 which is a discontinuous pulser, since the only operatively significant pulsations which it produces correspond to the successive holes in an information-carrying perforated tape, and therefore inherently occur irregularly, or randomly, and not continuously, or uninterruptedly. The terms CYCLICAL and CYCLICALLY, as employed herein denotes trains of pulsations, or other phenomena, which recur regularly at each passage of a stated or definite time period, or cycle of machine operation.

The expression DRAIN, as employed herein, denotes a supply head into which operating fluid flows from a fluidynamic information transmission channel, or the like, i.e., into which fluid is valved, or bled, from a fluidynamic information transmisison channel, or the like.

In the embodiments of the instant invention shown and described herein, for example, ambient atmosphere is the drain; while in the device of Lambert the vacuum in manifold 477 is the drain. However, the present invention is not limited to devices in which ambient atmosphere is the drain. Rather, the instant invention also embraces devices in which the pulsers, pulsators, modulators, purgers, or a combination of them, are enclosed in a housing, or housings, which are pressurized, evacuated, or contain fluids other than air at, above, or below, atmospheric pressure.

The term DWELL PERIOD, as used herein, denotes any period during which the volume of a respirator is unvarying.

The term EFFECTOR, as employed herein, denotes any output organ of a fluidynamic system whereby fluidynamic effects within the system are converted to mechanical motions, electrical signals, or the like, to operate, or otherwise, affect a utilization device (e.g., devices e in Buckley which co-operate with vane 57 to operate permutation bars *d* are effectors in the sense in which the term is employed herein).

The term ENERGIZER, as used herein, denotes any means for imparting energy, whether of flow, pulsation, or otherwise, to the operating fluid in a fluidynamic system (e.g., pump *h* of Buckley).

The expression EXCURSION TIME, or EXCURSION PERIOD, as employed herein, denotes the time taken by a repetitively movable member to execute one of its repetitive motions.

The term EXPIRATION PERIOD, as used herein, denotes any period during which the volume of a respirator is decreasing.

The term EXPIRE, as used herein, denotes the action of a respirator while its volume is decreasing.

FLOWTIGHT, as an adjective, denotes a fluidynamic device through which non-zero net flow cannot take place, e.g., the pulsers and pulsators employed in the embodiments of the instant invention shown and described herein. The term "fluidynamic device," as used in this definition, embraces complete information channels, as well as pulsers, pulsators, etc. Thus, the information channels of the devices of FIGS. 3 and 30 are flowtight, since each has but one aperture (at reader valve 187), and thus non-zero net flow cannot take place through them. Such flowtight channels having one aperture only are denoted as MONOAPERTURED herein. Throughputless channels apertured only to perform a function other than fluid supply as in FIG. 44 are denoted as QUASI-SEALED herein. Flowtight channnels which have no apertures of any kind are denoted as FULLY SEALED herein, e.g., the channels shown in FIG. 40.

FLUID-OPERATED, as an adjective, denotes devices or systems which operate through the medium of a liquid or gas (e.g., air), and includes vacuum, pneumatic, and hydraulic systems and devices, and combinations thereof.

FLUIDYNAMIC is synonymous with fluid-operated.

An INFORMATION TRANSMISSION CHANNEL, as the expression is employed herein, is a fluidynamic subsystem including receptor means for receiving afferent information and impressing it upon the operating fluid body of the subsystem, energizer means for imparting carrier energy to the operating fluid body of the subsystem, and effector means for manifesting the information impressed upon the operating fluid body of the subsystem by the receptor means.

The term INSPIRATION PERIOD, as employed herein, denotes any period during which the volume of a respirator is increasing.

The verb INSPIRE, as used herein, denotes the action of a respirator while its volume is increasing.

A MODULATOR, as the term is employed herein, is a fluidynamic device capable of so affecting selected ones of a train of carrier pulsations in a fluidynamic information transmission channel as to impress information thereupon, which information may be detected and manifested at a remote point of said fluidynamic information transmission channel.

A PULSATOR, as the term is employed herein, is a fluidynamic device adapted to produce mechanical output motion (e.g., vibration, reciprocation) in response to pulsations in an associated body of operating fluid. The unmodified term "pulsator" is broadly construed herein, and is *not* limited to the specific devices so-called herein, e.g., the devices of FIGS. 10 through 12 and 31 through 34. Further, the term "pulsator," as used herein is *not* limited to devices producing mechanical output *unless* triggered (e.g., by a perforation in a tape), but also applies to devices producing mechanical output *only when* triggered.

A PULSER, as the term is employed herein, is a fluidynamic device adapted to produce pulsations in a body of fluid. E.g., a respirator, such as pulsers 108 herein, a Coanda Effect oscillator, or the like.

A PURGER, as the term is employed herein, is a fluidynamic device adapted to purge, or drain, stored information or pulsation energy from one or a plurality of fluidynamic information transmission channels, either directly or by the agency of a device comprising part of said one or a plurality of channels.

The term RECEPTOR, as used herein, denotes any information input device of a fluidynamic system which acts to modify the state of the operating fluid in the system in response to afferent information (e.g., the tracker head *g* of Buckley).

A RESPIRATOR, as the term is employed herein, is a device the volume of which is cyclically altered to emit trains of pulsations into the operating fluid of a fluidynamic device.

The verb RESPIRE, as employed herein, denotes the action of a respirator, as defined herein.

The expression SINK is synonymous with drain.

The expression STORED PULSATION ENERGY denotes the information representing pattern of energy levels, e.g., deviations of fluid pressure from a norm, remaining in the information transmission channels of a fluidynamic system after the manifestation of said pattern at the output means of said channels.

The expression SUPPLY HEAD, as employed herein, and in accordance with its general acceptation in the fluidynamic arts, denotes a supply of operating fluid characterized by relatively constant pressure as compared with pressure in a fluidynamic information transmission channel, or the like. For example, U.S. Patent No. 2,894,614 (herein called "Lambert") shows an automatic, fluidynamic, perforated tape controlled typewriter which has two supply heads, viz., the substantially constant vacuum maintained in manifold 477, cf., FIGS. 26, 27, and 28, and the ambient atmosphere. Additional examples of automatic, fluidynamic, perforated tape controlled typewriters having two supply heads, viz., a substantially constant vacuum in a supply reservoir and ambient atmosphere, are U.S. Patent No. 2,351,663 (herein called "Clark") and Buckley.

The word "supply" as used in the previous paragraph, in accordance with its broadest acceptation, is not limited to a single body of operating fluid, the product of a single air or vacuum pump, or by any similar narrowing limitation, but embraces, for instance, a plurality of bodies of operating fluid all of which are maintained at substantially the same constant pressure level. Thus, a plurality of bodies of operating fluid all of which are maintained at substantially the same constant pressure level would be considered to be a single supply head, as the terms "supply" and "supply head" are used herein.

Further, the term "supply head," as used herein, is not limited to supplies of operating fluid at such pressure that operating fluid flows therefrom into an information transmission channel, or the like, but also embraces the opposite, i.e., supplies of operating fluid at pressure levels below those occurring in an associated information transmission channel, or the like, such that operating fluid flows from the channel into the supply. That is, the term "supply head" as used herein embraces vacuum supplies as well as pressure supplies. E.g., as noted hereinabove, the substantially constant vacuum in manifold 477 of Lambert is a supply head as the term is defined herein, though air clearly flows from the information channels of Lambert, generally 464, into manifold 477.

THROUGHPUTLESS is synonymous herein with flowtight.

UNMODULATED PULSER is synonymous with CONTINUOUS PULSER.

The verb VALVE, as employed herein, and in accordance with its general acceptation in the fluidynamic arts, means to control the flow of fluid by means of a valve, or the like.

The verb VENT, as employed herein, is synonymous with valve.

The expression VIBRATION TIME, or VIBRATION

PERIOD, as employed herein, denotes the time taken by a vibratory member, in the sense in which vibratory is defined hereinabove, to execute one of its repetitive movements.

The term VIBRATORY, as employed herein, denotes a member or subassembly which executes repetitive motion, and is not restricted to devices having resonant properties or operating at resonant frequency, e.g., the vibratory members, or vibrators, of pulsators 105 and 150 are driven in repetitive motion but are not markedly resonant since single ones of these repetitive motions are suppressed, or permitted, in the course of normal operation of the device of the invention without substantially effecting the next subsequent one of these repetitive motions or suppressions thereof.

(9.6) ALTERNATIVE EMBODIMENTS OF A SINGLE CHANNEL

(9.6.1) SINGLE INPUT, SINGLE OUTPUT, CAM-OPERATED PURGING

Referring now to FIG. 23a, there is shown therein the elements of a single information transmission channel employing cam-operated purging. This figure schematically represents, inter alia, a characteristic feature of the preferred embodiments of the instant invention, viz., that modulator valve 187 is located in close proximity to the common terminal point of conduits 114 and 149, i.e., the chamber corresponding to that channel in manifold 189, while the distance from the common point at manifold 189 to either pulsator 105 or pulser 108 is relatively great as compared with the distance between manifold 189 and modulator valve 187.

(9.6.2) MULTIPLE INPUT, MULTIPLE OUTPUT, CAM-OPERATED PURGING

Comparing FIG. 23b with FIG. 23a, the manner in which the instant invention may be adapted to employment in a data processing device having a plurality of information input devices and a plurality of information output devices may be seen. FIG. 23b, of course, represents but one information transmission channel of such a device, just as FIG. 23a represents but one information transmission channel of a cam-operated purging embodiment. Each of the input information sources shown at the left of FIG. 23b is so constructed and arranged as to provide six output code arms capable of properly deflecting the actuators of the corresponding spring valves. Thus, in the single channel shown in FIG. 23b, the card reader is provided with arm 180.1 which actuates actuator 185.1 of spring valve 187.1, the tape reader is provided with code arm 180.2 which actuates actuator 185.2 of spring valve 187.2, etc. Also, actuators 185.1, 185.2, and 185.3 are adapted to be actuated by corresponding purger cams 191.1, 191.2, and 191.3 in the manner in which actuator 185 is adapted to co-operate with purger cam 191 in the direct drive embodiment described hereinabove. It should be particularly noted that in this multi-input-output embodiment manifold 189.0 has within it as many separate chambers as the number of channels of the code which the device of this embodiment is adapted to read, or as many separate chamber-defining bodies as the number of channels of the code which the device of the embodiment is adapted to read. Thus, if one assumes that the information transmission channel arrangement of FIG. 23b is to be employed in a device for reading six channel codes, manifold 189.0 will have within it six separate chambers, or will be composed of six separate single chamber defining bodies. The single chamber for each channel will have communicating with it three modulator valves, e.g., 187.1, 187.2, and 187.3, one power conduit, e.g., 114.0 and three different information conduits, e.g., 149.1, 149.2, and 149.3. Thus, the pulser and all of the modulators and pulsators of each channel will be interconnected by means of a single chamber, the fluid within this chamber, the conduits, the pulsators, the pulser, and the interiors of the modulator valves constituting, in a sense, a single operating fluid body. It follows that the opening of any one of the modulator valves in a given information transmission channel will vent that entire channel to the drain pressure level, e.g., ambient atmosphere. For this reason it is necessary that means be provided in a complete working embodiment whereby only one of the input information sources is operated, the modulator valves of all of the channels of the other input information sources remaining closed, and such means may be provided by those having ordinary skill in the art. Similarly, where only one pulser per channel is provided, as shown in FIG. 23b, means will be provided whereby all but a selected one of the output devices may be immobilized, the provision of such means being within the scope of one having ordinary skill in the art.

(9.6.3) SINGLE INPUT, SINGLE OUTPUT, BLEEDER PURGING

FIG. 23c shows an information transmission channel according to the instant invention which differs from the channel shown in FIG. 23a only in that a bleeder passage 204 is employed for purging each channel, rather than cam 191, etc., of the embodiment of FIG. 23a. As will be apparent to those skilled in the art, the manifold chamber of each channel must be equipped with a bleeder passage 204, the size of the bleeder passage being determined empirically to effectively purge spurious "hangover" information without affecting correct operation.

(9.6.4) SINGLE INPUT, SINGLE OUTPUT, CHECK VALVE PURGING

FIG. 23d shows an information transmission channel according to the instant invention which differs from the channel shown in FIG. 23a only in that each chamber of manifold 189 is equipped with a check valve comprising a bore 205 communicating from the interior of the chamber to ambient atmosphere and a valve flap 206, rather than cam 191, etc., of FIG. 23a.

(9.6.5) SINGLE INPUT, SINGLE OUTPUT, FULLY SEALED

FIG. 40 shows a single information transmission channel according to an embodiment of the instant invention. This type of channel is denoted herein as "fully sealed."

Before describing the channel schematically represented in FIG. 40, however, the bellows valve 219 used therein will be particularly described in connection with FIG. 39. Generally described, the "bellows valve," or "sealed valve," of FIG. 39 is similar to the spring valve of my copending U.S. patent application Ser. No. 397,988, the valve used in several other embodiments herein, e.g., the embodiment of FIG. 23a.

As seen in FIG. 39, spring 210 is closed at its upper end by a plug upon which is mounted actuator 209, and at its lower end is sealed to a body member 211 having an internal aperture communicating from the interior of the spring and adapted to be engaged with a conduit section, whereby the interior of spring 210 is in communication with the interior of said conduit section. In these respects the bellows valve is similar to the valve of my above-cited copending patent application.

The bellows valve of FIG. 39 differs from the valve of my copending patent application by the addition of flange 212, bellows 213, and terminal pipe 216.

Flange 212 is affixed and fluid-tightly sealed to terminal member 211 at its end closest to the stop which limits the engagement of spring 210 with a projecting part of body member 211.

Bellows 213 has a skirt projecting over the end of flange 212 nearest spring 210, and is cemented, or otherwise sealed and affixed, to the outer surface of flange 212 over a cylindrical area designated as 215.

The end of bellows 213 remote from joint 215 is itself joined and sealed, to the plug which closes the outer end of spring 210 and supports actuator 209.

Thus, flange 212, bellows 213, the plug supporting actuator 209, and spring 210 coact to define a chamber 218.

Communication with chamber 218 is provided in two ways, i.e., by means of spring 210 or by means of terminal pipe 216.

Firstly, the interior of chamber 218 is sealed from the interior of body member 211 whenever the turns of spring 210 are tightly closed, whereas when actuator 209 is deflected and the turns of spring 210 separated, the interior of chamber 218 is in direct communication with the interior of body member 211.

Terminal pipe 216 is also in communication with the interior of chamber 218, by means of bore 217. That is, the interior of terminal pipe 216 is in direct connection with the interior of chamber 218, and, thus, any other device in the several embodiments of the invention may be put into direct communication with the interior of chamber 218, e.g., by means of tubing affixed to terminal pipe 216.

As may be seen from the above, then, the bellows valve provides communication between the interior of terminal pipe 216 and the interior of body member 211, via chamber 218, when actuator 209 is deflected, and not otherwise.

Going now to the operation of the embodiment of the instant invention a single channel of which is schematically represented in FIG. 40, and bearing in mind the conventions shown in FIG. 22, as well as the other embodiments shown in single channel schematic representation herein, it may be seen that the reader of this embodiment differs from the reader of the other embodiments previously shown herein in that bellows valves 219 are substituted for the unsealed spring valves employed in those embodiments, and manifold 223, having six chambers, each in communication with two terminal pipes, is substituted for the manifold employed in the readers of the earlier-shown embodiments.

Also, the single channel embodiment of FIG. 40 differs from the single channel embodiments described hereinabove by the inclusion of accumulator 226, which provides relief from external pressures whenever pulser 225 is expanding and, at the same time, bellows valve 219 is closed. This accumulator is represented by the pulsator symbol of FIG. 22a, having an "A" set in the position relative to it, which is usually occupied by a symbol designating a driven device, e.g., the "KEYBOARD DRIVE" symbol set next to the symbol for pulsator 222 in this same figure (40). This mode of representing an accumulator is employed herein for the reason that it is convenient to employ a pulsator, e.g., a pulsator of the type shown in FIGS. 10, 11, and 12, to function as an accumulator, the pulsator so employed being "unloaded" in the sense that its vibrator, or moving member (153, FIG. 11) is not coupled to a load device of any kind, but left free to move, and its return spring (155, FIG. 11) is increased in strength so as to provide optimum service as an accumulator.

Returning to FIG. 40, it may be seen that the interior of body member 211 is in direct comunication with the interior of pulser 225 and the interior of accumulator 226 by way of one of the chambers of manifold 223 and conduit means 224. Also, the interior of chamber 218 of valve 219 is maintained in communication with the interior of pulsator 222 by means of terminal pipe 216 and conduit means 221.

Purger cam 220 may be identical in structure and function to, e.g., purger cam 191 of FIG. 23a.

Taking into consideration the structure and operation of bellows valve 219, as described hereinabove, the single channel embodiment of FIG. 40 may be seen to operate as follows:

(1) When a perforation in the tape being read is sensed by arm 180 (cf. FIG. 7), valve 219 is opened, thereby providing communication from conduit means 224 to conduit means 221. Thus, when pulser 225 opens the vacuum produced thereby, being communicated via valve 219 to pulsator 222, causes pulsator 222 to deflect and displaces its associated permutation bar in the keyboard drive, whereas (2) When arm 180 is raised by contact with the web of tape 175 (FIG. 7), and valve 219 is closed, the vacuum produced by the opening of pulser 225 is not communicated to pulsator 222, and thus the moving member of pulsator 222 is not deflected.

It will be noted that the relationship between perforation sensing and permutation bar deflection is reversed in the embodiment of FIG. 40 as compared with certain other embodiments herein, e.g., the embodiment of FIG. 23a. That is to say, the reading of a perforation by arm 180 (FIG. 7) results in the opening of a valve in either case (i.e., FIG. 23a or FIG. 40). But, in the FIG. 23a embodiment, the opening of the valve vents the channel to ambient atmosphere, thereby preventing the deflection of the movable member of the pulsator by means of vacuum produced by the opening of the pulser. That is, in the embodiment of FIG. 23a, the reading of a perforation prevents the deflection of the movable member of the pulsator. In the embodiment of FIG. 40, however, the opening of valve 219, upon detection of a perforation by arm 180, puts conduit means 224 into communication with conduit means 221, thereby enabling the vacuum produced by the opening of pulser 225 to actuate the movable member of pulsator 222. Thus, the reading of a perforation in the embodiment of FIG. 40 enables the deflection of the movable member of the pulser.

As will be apparent to those having ordinary skill in the art, the converse operation of the channel of FIG. 40 as compared with the channel of FIG. 23a necessitates a new configuration of slots in the top of the permutation bars of the typewriter or other device in which the FIG. 40 embodiment is used in order to produce the same results produced by the embodiment of FIG. 23a in the same machine. Since, however, the provision of such a new configuration may be accomplished largely empirically, and is well within the scope of one having ordinary skill in the art, such a configuration is not described herein.

(9.6.6) SINGLE INPUT, SINGLE OUTPUT, QUASI-SEALED

FIG. 44 shows a quasi-sealed information transmission channel according to the instant invention which is adapted for use in powered automatic typewriters, inter alia.

Before describing the embodiment of FIG. 44 and its operation in detail, however, the particular type of pulsator, viz., push-pull, employed in the embodiment of FIG. 44 will be described in connection with FIGS. 41, 42, and 43.

The push-pull pulsator shown in FIGS. 41 through 43 generally comprises two pulsators of the direct drive type, as shown in FIGS. 10, 11, and 12, which are modified to coact with a single movable member, and which have eliminated therefrom the return springs, unnecessary in the push-pull mode.

Thus, the push-pull pulsator of FIGS. 41, 42, and 43 includes two fixed elements, or bodies, 228 and two pouches 230, these elements functioning in substantially the same manner as their corresponding elements 152 and 151 in the direct drive pulsator of FIGS. 10, 11, and 12.

The movable members, or vibrators, 153 of the direct drive devices according to FIGS. 10, 11, and 12 are eliminated in constructing the push-pull pulsator, and, in their stead, is substituted a single movable member, or vibrator, 231 which coacts with the two pouches 230 in a manner analogous to the coaction of movable member 153 with pouch 151. In the push-pull embodiment, however, no return spring (such as 155 of FIG. 11) is necessary because the forces produced by pressure in the two pouches oppose each other. Movable member 231, as may be seen in FIGS. 41, 42, and 43, is pivoted to end members 229 by means of fulcrum rod 233, end members 229 serving in turn to maintain the two fixed elements 228 in rigidly fixed relationship with respect to each other.

It will aso be noted from FIGS. 41 through 43 that the two "pans" 248 of the push-pull embodiment are equipped with orifice pipes 232, these "pans" and orifice pipes functioning in a manner analogous to the "pan" 159 and orifice pipe 160 of the direct drive device shown in FIGS. 10, 11, and 12.

As is most clearly seen in FIG. 42, tongue, or movable member, 231 of the push-pull pulsator is adapted to coact with, and displace, a permutation bar, such as 234, this permutation bar conveniently comprising a portion of an automatic powered typewriter, e.g., Buckley, though the application of this embodiment of the instant invention (push-pull) is by no means limited to typewriters, nor to data processing devices as a class.

By analogy to the pulsators employed in other embodiments herein it may be seen that, in the application of this embodiment, orifice pipes, or terminal pipes, 232 are adapted to have connected therewith the ends of a pair of conduits, the opposite ends of these conduits being connected to reader means, such as is shown in FIG. 44, or other suitable devices for actuating the push-pull pulsator. Thus, it may be seen in FIG. 44 that the push-pull pulsator 237 shown therein has its opposite orifice pipes connected by means of conduits 249, 250 to corresponding orifice pipes, or terminal pipes, 251, 252 of reader 234. Considering now reader 234, as shown in the left-hand portion of FIG. 44, it will be seen that this device is adapted to read, e.g., perforated paper tape 239 which is fed through a horizontal slot between body blocks 253 and 254 by means of transport mechanism 240, 241. Since transport mechanism 240, 241 may be any one of a number of devices long known in the prior art, it will not be described in detail herein.

A segment of tape 239 punched according to a code which may be employed with a reader of the general type of reader 234 is shown in FIG. 46.

By comparison of the tape segment of FIG. 46 and the cutaway view of reader 234 (FIG. 44), it may be seen that the "code" employed in this system utilizes eight columns, or channels, of possible punching locations, and two rows of such punchings, one punched and the other non-punched, to represent each "character" stored upon the tape. These "columns" are, by a convention well recognized in the art, defined as linear arrangements of punching locations extending longitudinally of the tape, while the "rows" are similarly defined as linear arrangements of punching locations extending transversely of the tape.

Further, it can be seen that three "characters" are punched into the segment of tape shown in FIG. 46. That is to say, adjacent pairs of rows of punchings in FIG. 46 are more closely spaced with respect to each other than are such groups spaced with respect to each other. For instance, the leftmost pair of rows shown in FIG. 46 contain three punches and five punches, respectively, while the middle pair of rows in FIG. 46 has four punches in each of its rows.

Sprocket holes in the tape of FIG. 46 (not shown) may be provided by the exercise of ordinary skill, without the exercise of invention.

Going now to reader 234 (FIG. 44) it will be seen that two substantially vertically disposed channels pass through body blocks 253, 254 and intersect with tape 239. The leftmost of these channels, as seen in FIG. 44, i.e., 243, 243', is designated the "1" channel, while the rightmost of these channels, 244, 244', is designated the "0" channel.

In the operation of the device of FIG. 44, the paper tape is advanced by means of transport 240, 241 so that whenever reading takes place the punching locations of a left-hand row of a pair on the tape are disposed at the "1" channels 243, 243' of reader 234, while the right-hand row of the same pair of punching locations is disposed in registration with the "0" channels 244, 244' of reader 234. While only one "1"–"0" pair of channels is shown in the body blocks in FIG. 44, it will be realized by those having ordinary skill in the art that body blocks 253, 254 in fact include eight pairs of channels, each coacting with a pair of punching locations on tape 239.

Thus, whenever a character of tape 239 is "on station," or accurately positioned, in read head 234, each of its pairs of "1"–"0" channels will cause one channel to be blocked by paper tape web, and one channel to be continuous through the paper tape by means of a perforation.

As may also be seen in FIG. 44, the lower ends of each "1"–"0" pair of channels 234', 244' are joined by means of passage 245, passage 245 itself being joined to terminal pipe 246. Thus, channels 244' and 243' are directly communicating, in common, to terminal pipe 246.

Channels 243 and 244 are joined to terminal pipes 251 and 252.

Terminal pipe 251 directly communicates with the left-hand terminal pipe of push-pull pulsator 237 by means of conduit 249, while terminal pipe 252 directly communicates with the right-hand terminal pipe of push-pull pulsator 237 by means of conduit 250. That is to say, the "1" channel 243 of reader block 234 is in direct communication with the left-hand chamber of push-pull pulsator 237, while the "0" channel 244 of reader block 234 is in direct communication with the right-hand side of push-pull pulsator 237.

The lower terminal pipe 246 of reader 234 is in direct connection by means of conduit 247 with pulser 208, accumulator 235, and a service valve 236. Service valve 236 is, of course, provided as a convenient means of accomplishing proper pressure distribution within the system of FIG. 44 after servicing, and it is to be understood that similar service valves may be provided, where necessary and desirable, in any of the other embodiments of the instant invention shown and described herein without the exercise of invention.

Accumulator 235 herein serves essentially the same function as that of accumulator 226 described in connection with FIG. 40 hereinabove.

Pulser 208, as indicated by its symbol, is one of the pulsers widely used herein and described in connection with FIGS. 17, 18, 19, and 20 hereinabove.

In view of the above, the mode of operation of the embodiment of FIG. 44 will be clear to those having ordinary skill in the art and may be broadly and generally described as follows:

Considering the single pair of channels 243, 243'; 244, 244' illustrated in FIG. 44, i.e., the "1"–"0" channels nearest the reader, two cases of reading may be seen to have the following effects:

When the "1" channel is blocked by paper web and the "0" channel is maintained open by a perforation, then, as pulser 208 opens, a vacuum will be transmitted to the right-hand side of pulsator 237, while the amount of operating fluid in the left-hand side of pulsator 237 remains "normal." Thus, tongue, or moving member, 255 of pulsator 237 is reflected to the right, resulting also in the deflection to the right of permutation bar 238.

Similarly, blocking of the "0" channel in reader 234, and unblocking of the "1" channel therein, will result in leftward deflection of tongue 255 of pulsator 237, resulting in leftward deflection of permutation bar 238.

From the above it will be apparent to those having ordinary skill in the art that a positive, non-ambiguous system of producing selected deflections of permutation bar 238, and its associated permutation bars, is provided by the system shown in FIG. 44, along with the tape code illustrated in FIG. 46. This tape code need not, of course, be specifically set out, since a large plurality of possible tape codes may be selected from those available when employing this arrangement, at the convenience and within the skill of the ordinary worker in the art.

It will also be realized by those having ordinary skill in the art that a most expeditious manner of operating the channels of this system is to arrange that transport 240, 241 dwells with tape 239 located "on station" in reading head 234 during each entire open-close cycle of pulser 208, thus resulting in the restoration to the selected side of pulsator 237 of the air, or other operating fluid, abstracted therefrom during the opening of pulser 208. The arrangement of a transport mechanism to provide such dwell characteristics is within the scope of an ordinary worker in the art and, thus, such a transport mechanism is not described in detail herein.

As will be clear to those having ordinary skill in the art, this type of "full dwell" operation results in all of the permutation bars being returned to their neutral position, i.e., whereat the tongues of their corresponding push-pull pulsators are equidistant from the two fixed elements thereof, during each cycle of operation.

Additionally, it will be seen that the amount of deflection of the permutation bars produced on each cycle of operation, i.e., reading of a character, may be only one-half the deflection produced on each cycle of operation in the other embodiments shown and described herein.

This type of springless, neutral-return operation results in many advantages in devices in which it is employed, particularly the advantage that the permutation bars are not longitudinally distorted in travelling-wave manner by high acceleration forces acting when they are deflected, as is the case with, for example, Buckley, resulting in serious operating speed limitations.

It will also be recognized by those having ordinary skill in the art that accumulator 235 functions in the embodiment of FIG. 44 to give pressure relief when, and only when, the abnormal state of operation occurs in which both the "1" and "0" channels of reader 234 are blocked during the opening of pulser 208. In some physical realizations of this embodiment the inclusion of accumulator 235 will be rendered unnecessary by wall flexibility of conduit 247. Similarly service valve 236 may be dispensed with in some realizations of the embodiment of FIG. 44. These elements made be added to other embodiments herein by exercise of ordinary skill in the art.

An alternative embodiment of the push-pull pulsator is schematically shown in FIG. 45. It will be seen that this version of the push-pull pulsator differs substantially only in the inclusion of a detent (shown schematically as a small triangle) 256. This alternative embodiment of the push-pull pulsator, as substituted in the embodiment of FIG. 44, will have desirable application in certain types of equipment, e.g., textile machines, sewing equipments, etc., where it will be used to perform certain essentially "two-position" functions, such, for instance, as heddle frame control.

Whether the detented, or detentless, version of the push-pull pulsator is employed, however, and in whatever type of machinery, the tape will be properly perforated with a "bi-level," or "two-bit" code such that successive characters printed by an associated typewriter, successive heddle frame positions of an associated loom, etc., are successively accomplished in a predetermined manner according to information borne by the tape.

While certain combinations of direct drive, cam-powered drive, single and multiple input and/or output, cam-operated purging, bleeder purging, check valve purging, mono-apertured channels, quasi-sealed channels, and fully sealed channels have been shown and described herein, it will be realized that the instant invention is not in any way limited by the fact that these particular combinations have been chosen for illustration, other combinations of the same elements and sub-systems also falling within the scope of the instant invention.

(10) CONSTRUCTION OF A COMPLETE EMBODIMENT

Going now to FIG. 25, and interpreting it by comparison with FIG. 3 and the symbol chart of FIG. 22, it may be seen that a schematic disclosure of a six-channel, single input, single output, cam-operated purge embodiment of the instant invention is provided therein. As may be seen in FIG. 25, the six-channel, direct drive embodiment comprises elements which are repeated for each channel (having hyphenated suffixes) and elements which are common to all channels (without suffix). Thus, there are six pulsers, 108–1 through 108–6, one per channel; six power conduits 114–1 through 114–6, one per channel; six efferent information conduits 149–1 through 149–6; six separate chambers (shown as the intersection of the lines representing each conduit 114 and conduit 149), these chambers being embodied in a single manifold 189; six modulator valves 187–1 through 187–6, actuators 185–1 through 185–6, and code arms 180–1 through 180–6; six permutation bars; and six pulsators 105–1 through 105–6. The elements common to all channels shown in FIG. 25 include drive motor 22; toothed belt and cog wheels 51, 101, 52; drive shaft 25; gear set 24, 26; gear set 62, 63; cycle clutch 128; cycle clutch 102; drive shaft 127 and the associated cam and reciprocating arm means employed to supply power to the pulsers; purger cam 191 and its associated drive apparatus; tape feed pawl and ratchet 68, 67 and the eccentric drive means therefor; and the keystroke cam 60. Immediately above cycle clutches 128 and 102 are shown their corresponding arrester arms 131 and 104.

(11) OPERATION OF A COMPLETE EMBODIMENT

Referring now to FIGS. 24 through 28, the operation of the six-channel single input, single output, cam-powered purge embodiment will be described, FIG. 24 being a phase diagram of the basic operating cycle of this embodiment, and FIGS. 25, 26, 27, and 28, respectively, showing the state of operation of all the major parts of this embodiment at the indicated times (in degrees) of the operating cycle shown in FIG. 24.

The states of operation of the various elements shown in FIGS. 25 through 28 are symbolized as follows:

The states of operation of the pulsers 108–1 through 108–6, the modulator valves 187–1 through 187–6, and the pulsators 105–1 through 105–6 are shown by means of the condition symbols placed next to them, these condition symbols being shown in FIG. 22 and described hereinabove.

The states of operation of the cycle clutches 128 and 102 are indicated by the angular relationship between their detents 144, 257 and the L-shaped symbols representing their arrester arms 131, 104, the convention being adopted with respect to these clutches, and all other rotary parts, that the correct direction of rotation as shown in FIGS. 25 through 28 is counter-clockwise.

The states of operation of purger cam 191 are indicated by the angular positions of the symbols representing it, the times of the basic cycle at which purging is taking place being indicated by contact between the purger cam symbols and the straight-line symbols representing the actuators of the modulator valves. As with the cycle clutches, the convention is adopted with respect to the purger cam symbols that the correct direction of rotation is shown as counter-clockwise in FIGS. 25 through 28.

The states of operation of keystroke cam 60 are indicated by means of a shaded cross-section superposed upon the rectangle representing it in each of the FIGS. 25 through 28, the convention being adopted that these shaded cross-sections are cross-sections looking from the left-hand side of the device when the device is in its normal operating position. As with the cycle clutches, the convention is adopted that the correct direction of rotation of the key-stroke cam as represented by its shaded cross-section is shown as counter-clockwise in FIGS. 25 through 28.

The states of operation of the tape feed ratchet and pawl 67, 68 are indicated by the relative positioning of the symbols for these two elements, the state of rest or direction of motion of each of these two elements being indicated by a dot or arrow placed adjacent thereto.

The states of operation of the permutation bars are not indicated here, the positioning of the individual permutation bars being determined by the states of operation of their associated pulsators, which states are indicated by symbols placed adjacent the pulsator symbols.

The states of operation of the actuator arms 180-1 through 180-3, i.e., whether they are in their upper or lower positions as defined hereinabove, are indicated by placing an arrow next to the symbols representing actuator bars which are in their lower, or modulator valve-actuating, state.

It should be noted that, though the symbols for the purger cam 191 are on the same side of the symbols for the actuators 185-1 through 185-6 as the main body of the symbols for the actuating arms 180-1 through 180-6, this particular juxtaposition of symbols is merely selected for convenience of illustration, there being no intention to thereby represent the relative positioning of these elements as different from that shown in FIGS. 7 and 8.

With these symbols and conventions in mind, the states of operation of all of the major parts of the six-channel single input, single output, cam-operated purge embodiment at the times, or phases, of the basic operating cycle shown in FIGS. 25 through 28 may be deduced.

It will be appreciated that by the above described embodiments, and the novel and inventive constructions and methods of operations embodied therein, there are provided fluidynamic systems having several distinct advantages over prior art devices. Among these advantages are simplicity of construction, e.g., freedom from check valves, and the like, cheapness of construction, e.g., freedom from the necessity of using closely regulated, substantially constant head pumps, freedom from the storage of the "memory" of prior information in the information transmission channels when new information is being read or manifested at the output devices of these channels thereby freeing fluidynamic systems from prior speed limitations inherent in such "memory" phenomena, freedom from multiple supply heads, etc.

It will thus be seen that the objects set forth above, among those made apparent from the preceding description, are efficiently attained and, since certain changes may be made in the above-described constructions and methods without departing from the scope of the invention, it is intended that all matter contained in the above description and shown in the accompanying drawings shall be interpreted as illustrative and not in a limiting sense.

It is particularly noted that although the instant invention has been disclosed herein as applied to automatic powered typewriters, the instant invention is equally applicable to a broad variety of data processing devices, and to other devices not commonly thought of as data processing devices, e.g., automatic musical instruments, railroad interlocking machines, machine tools, textile machinery, sewing and knitting equipment, etc.

It is also to be understood that the following claims are intended to cover all of the generic and specific features of the invention herein described, and all statements of the scope of the invention which, as a matter of language, might be said to fall therebetween.

What is claimed is:
1. A fluidynamic system including a plurality of information transmission channels, each channel comprising: first and second throughputless collapsible containers respectively situated at spaced apart locations, conduit means coupling the interiors of said containers together in a fluid tight relationship, means for continuously varying the volume of said first container in a predetermined fashion in synchronism with the variation of the volumes of the first containers in the other ones of said channels, an output member, means for coupling said second container to said output member whereby said output member is movable with said second container when said second container expands and contracts, and means for selectively impairing said fluid tight relationship in accordance with data signals to correspondingly drive said output member.

2. A fluidynamic system including a plurality of throughputless information transmission channels, each channel comprising: receptor means, effector means, and energizer means, said receptor, effector, and energizer means being joined only by conduit means, and said energizer means continuously pulsing its associated channel in synchronism with the pulsing of the other ones of said channels by their associated energizer means.

3. A fluidynamic system including a plurality of information transmission channels, each channel comprising: receptor means, effector means, and energizer means, said energizer means continuously injecting a predetermined volume of fluid into its associated channel and extracting an equal volume of fluid therefrom in synchronism with the injection and extraction of fluid by the energizer means associated with the other ones of said channels, and said receptor means preventing selected cycles of fluid injection and extraction from affecting said effector means in accordance with afferent information.

4. A fluidynamic system including a plurality of cooperating information transmission channels, each channel comprising: an energizer adapted to urge the fluid in at least a first part of said channel to continuously move in alternate directions in synchronism with the motion of the fluid in the first parts of the other ones of said channels, an effector adapted to cyclically move an output member in accordance with the movement of the fluid in a second part of said channel, and receptor means adapted to selectively substantially prevent the motion of the fluid in said first part of said channel from being transmitted to said second part of said channel.

5. A fluidynamic system as claimed in claim 4 in which said receptor means operate by selectively blocking their associated channels between said first parts and said second parts thereof.

6. A fluidynamic system as claimed in claim 4 in which said receptor means operate by selectively venting their associated channels at locations between said first parts and said second parts thereof.

References Cited

UNITED STATES PATENTS

| | | | |
|---|---|---|---|
| 522,285 | 7/1894 | Boynton | 197—15 X |
| 901,273 | 10/1908 | Wright | 197—15 X |
| 1,537,080 | 5/1925 | Grah | 251—57 X |
| 1,963,576 | 6/1934 | Boerlage | 60—62.6 |
| 2,247,275 | 6/1941 | Buckley | 197—20 |
| 2,615,379 | 10/1962 | De Groff | 60—62.6 X |
| 2,648,199 | 8/1963 | Alderson | 60—62.6 X |
| 3,219,165 | 11/1965 | Greene et al. | 197—20 |
| 3,228,509 | 1/1966 | Griffin et al. | 197—20 |

ROBERT E. PULFREY, *Primary Examiner.*

E. S. BURR, *Assistant Examiner.*